United States Patent
Skakkebaek et al.

(10) Patent No.: US 7,907,704 B2
(45) Date of Patent: *Mar. 15, 2011

(54) CACHING USER INFORMATION IN AN INTEGRATED COMMUNICATION SYSTEM

(75) Inventors: Jens Skakkebaek, San Carlos, CA (US); Willem R. B. Potze, Santa Clara, CA (US); Heine Frifeldt, Mountain View, CA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/016,350

(22) Filed: Jan. 18, 2008

(65) Prior Publication Data

US 2008/0133548 A1 Jun. 5, 2008

Related U.S. Application Data

(63) Continuation of application No. 11/053,272, filed on Feb. 7, 2005, now Pat. No. 7,321,655.

(51) Int. Cl.
  *H04M 11/00* (2006.01)
(52) U.S. Cl. ............... 379/88.13; 379/88.17; 379/88.25
(58) Field of Classification Search .............. 379/88.13, 379/88.14, 88.17, 88.25; 370/354
See application file for complete search history.

(56) References Cited

U.S. PATENT DOCUMENTS

| | | | |
|---|---|---|---|
| 5,029,199 A | 7/1991 | Jones et al. | |
| 5,345,501 A | 9/1994 | Shelton | |
| 5,568,540 A * | 10/1996 | Greco et al. | 379/88.25 |
| 5,572,578 A | 11/1996 | Lin et al. | |
| 5,647,002 A | 7/1997 | Brunson | |
| 5,703,942 A | 12/1997 | Pinard et al. | |
| 5,712,901 A | 1/1998 | Meermans | |
| 5,717,742 A | 2/1998 | Hyde-Thomson | |
| 5,742,668 A | 4/1998 | Pepe et al. | |
| 5,778,390 A | 7/1998 | Nelson et al. | |
| 5,845,203 A | 12/1998 | LaDue | |
| 5,903,627 A | 5/1999 | Shaffer et al. | |

(Continued)

FOREIGN PATENT DOCUMENTS

DE 10338237 3/2005

(Continued)

OTHER PUBLICATIONS

Notice of Allowance for U.S. Appl. No. 11/053,425, mailed Jan. 4, 2010.

(Continued)

*Primary Examiner* — Simon Sing
(74) *Attorney, Agent, or Firm* — Sheridan Ross P.C.

(57) ABSTRACT

An integrated messaging system for performing various types of messaging across different types of networks, including integrated user interfaces and administrator interfaces. Embodiments include a communication server that couples among networks of different types, and an interface module that couples to the communication server. The interface module may be hosted on a messaging server of a network. The interface module pulls various user information from the messaging server, including information relevant to at least the network that includes the messaging server. A cache couples to the communication server and to the interface module to hold information from the communication server and/or the user information pulled from messaging server. The interface module directs a message from the messaging server and/or the cache to at least one device on the networks using the user information.

13 Claims, 18 Drawing Sheets

U.S. PATENT DOCUMENTS

| | | | |
|---|---|---|---|
| 5,909,483 | A | 6/1999 | Weare et al. |
| 5,915,001 | A | 6/1999 | Uppaluru |
| 5,946,386 | A | 8/1999 | Rogers et al. |
| 5,995,596 | A | 11/1999 | Shaffer et al. |
| 6,021,181 | A | 2/2000 | Miner et al. |
| 6,047,053 | A | 4/2000 | Miner et al. |
| 6,052,709 | A | 4/2000 | Paul |
| 6,070,081 | A | 5/2000 | Takahashi et al. |
| 6,072,862 | A * | 6/2000 | Srinivasan ............. 379/100.08 |
| 6,076,090 | A | 6/2000 | Burroughs et al. |
| 6,085,231 | A | 7/2000 | Agraharam et al. |
| 6,138,209 | A | 10/2000 | Krolak et al. |
| 6,163,794 | A | 12/2000 | Lange et al. |
| 6,181,780 | B1 | 1/2001 | Finnigan |
| 6,233,318 | B1 * | 5/2001 | Picard et al. ............... 379/88.17 |
| 6,253,206 | B1 | 6/2001 | Burton et al. |
| 6,275,570 | B1 | 8/2001 | Homan et al. |
| 6,304,636 | B1 | 10/2001 | Goldberg et al. |
| 6,317,484 | B1 | 11/2001 | McAllister |
| 6,317,485 | B1 | 11/2001 | Homan et al. |
| 6,324,265 | B1 | 11/2001 | Christie, IV et al. |
| 6,339,776 | B2 | 1/2002 | Dayani-Fard et al. |
| 6,351,523 | B1 | 2/2002 | Detlef |
| 6,389,115 | B1 | 5/2002 | Swistock |
| 6,389,276 | B1 | 5/2002 | Brilla et al. |
| 6,396,907 | B1 | 5/2002 | Didcock |
| 6,396,908 | B1 | 5/2002 | O'Donovan et al. |
| 6,405,035 | B1 | 6/2002 | Singh |
| 6,411,685 | B1 * | 6/2002 | O'Neal ...................... 379/88.14 |
| 6,434,222 | B1 | 8/2002 | Shaffer et al. |
| 6,438,215 | B1 | 8/2002 | Skladman et al. |
| 6,493,431 | B1 | 12/2002 | Troen-Krasnow et al. |
| 6,501,750 | B1 | 12/2002 | Shaffer et al. |
| 6,519,327 | B1 | 2/2003 | Cannon et al. |
| 6,519,571 | B1 | 2/2003 | Guheen et al. |
| 6,524,274 | B1 | 2/2003 | Rosenthal et al. |
| 6,526,274 | B1 | 2/2003 | Fickes et al. |
| 6,549,612 | B2 | 4/2003 | Gifford et al. |
| 6,553,563 | B2 | 4/2003 | Ambrose et al. |
| 6,587,871 | B1 | 7/2003 | Schrader |
| 6,618,763 | B1 | 9/2003 | Steinberg |
| 6,629,138 | B1 | 9/2003 | Lambert et al. |
| 6,671,800 | B1 | 12/2003 | McInally et al. |
| 6,683,940 | B2 | 1/2004 | Contractor |
| 6,714,778 | B2 | 3/2004 | Nykanen et al. |
| 6,721,398 | B1 * | 4/2004 | Pitcher ...................... 379/88.13 |
| 6,725,205 | B1 | 4/2004 | Weiler et al. |
| 6,731,927 | B1 | 5/2004 | Stern et al. |
| 6,832,373 | B2 | 12/2004 | O'Neill |
| 6,853,714 | B2 | 2/2005 | Liljestrand et al. |
| 6,871,346 | B1 | 3/2005 | Kumbalimutt et al. |
| 6,937,724 | B1 | 8/2005 | Kozdon et al. |
| 6,947,989 | B2 | 9/2005 | Gullotta et al. |
| 6,950,502 | B1 | 9/2005 | Jenkins |
| 6,950,990 | B2 | 9/2005 | Rajarajan et al. |
| 6,952,558 | B2 | 10/2005 | Hardacker |
| 6,957,186 | B1 | 10/2005 | Guheen et al. |
| 6,996,413 | B2 | 2/2006 | Inselberg |
| 7,068,668 | B2 | 6/2006 | Feuer |
| 7,072,934 | B2 | 7/2006 | Helgeson et al. |
| 7,082,469 | B2 | 7/2006 | Gold et al. |
| 7,092,504 | B1 | 8/2006 | Buller |
| 7,136,461 | B1 | 11/2006 | Swingle et al. |
| 7,136,865 | B1 | 11/2006 | Ra et al. |
| 7,151,823 | B2 | 12/2006 | Durkin |
| 7,167,550 | B2 | 1/2007 | Klos et al. |
| 7,203,288 | B1 | 4/2007 | Dwyer et al. |
| 7,222,156 | B2 | 5/2007 | Gupta et al. |
| 7,281,269 | B1 | 10/2007 | Sievers et al. |
| 7,321,655 | B2 | 1/2008 | Skakkebaek et al. |
| 7,330,537 | B2 | 2/2008 | Frifeldt et al. |
| 7,346,150 | B2 | 3/2008 | Frifeldt et al. |
| 7,373,607 | B2 | 5/2008 | Daniell |
| 7,379,540 | B1 | 5/2008 | Van Gundy |
| 7,519,984 | B2 | 4/2009 | Bhogal et al. |
| 7,564,954 | B2 | 7/2009 | Frifeldt et al. |
| 7,680,820 | B2 | 3/2010 | Denoue et al. |
| 2002/0032752 | A1 | 3/2002 | Gold et al. |
| 2002/0049749 | A1 | 4/2002 | Helgeson et al. |
| 2002/0064149 | A1 | 5/2002 | Elliott et al. |
| 2002/0115454 | A1 | 8/2002 | Hardacker |
| 2002/0123331 | A1 | 9/2002 | Lehaff et al. |
| 2002/0123342 | A1 | 9/2002 | Lehaff et al. |
| 2002/0131573 | A1 | 9/2002 | Berkley et al. |
| 2002/0143877 | A1 | 10/2002 | Hackbarth et al. |
| 2002/0147801 | A1 | 10/2002 | Gullotta et al. |
| 2002/0165986 | A1 | 11/2002 | Tarnoff |
| 2002/0169876 | A1 | 11/2002 | Curie et al. |
| 2002/0188453 | A1 | 12/2002 | Hirschberg et al. |
| 2003/0028603 | A1 | 2/2003 | Aktas et al. |
| 2003/0046421 | A1 | 3/2003 | Horvitz et al. |
| 2003/0050046 | A1 | 3/2003 | Conneely et al. |
| 2003/0128820 | A1 | 7/2003 | Hirschberg et al. |
| 2003/0140112 | A1 | 7/2003 | Ramachandran et al. |
| 2003/0195934 | A1 | 10/2003 | Peterson et al. |
| 2003/0220784 | A1 | 11/2003 | Fellenstein et al. |
| 2003/0220975 | A1 | 11/2003 | Malik |
| 2004/0002325 | A1 | 1/2004 | Evans et al. |
| 2004/0019644 | A1 | 1/2004 | Fellenstein et al. |
| 2004/0022379 | A1 | 2/2004 | Klos et al. |
| 2004/0039786 | A1 | 2/2004 | Horvitz et al. |
| 2004/0044687 | A1 | 3/2004 | Vachuska et al. |
| 2004/0044989 | A1 | 3/2004 | Vachuska et al. |
| 2004/0049696 | A1 | 3/2004 | Baker et al. |
| 2004/0062368 | A1 | 4/2004 | Durkin |
| 2004/0064502 | A1 | 4/2004 | Yellepeddy et al. |
| 2004/0109544 | A1 | 6/2004 | Didcock et al. |
| 2004/0111702 | A1 | 6/2004 | Chan |
| 2004/0120480 | A1 | 6/2004 | Didcock et al. |
| 2004/0121761 | A1 | 6/2004 | Tripathy et al. |
| 2004/0146144 | A1 | 7/2004 | Gao et al. |
| 2004/0171381 | A1 | 9/2004 | Inselberg |
| 2004/0186861 | A1 | 9/2004 | Phatak |
| 2004/0199587 | A1 | 10/2004 | McKnight |
| 2004/0225525 | A1 | 11/2004 | Weitzman |
| 2004/0253956 | A1 | 12/2004 | Collins |
| 2004/0258231 | A1 | 12/2004 | Elsey et al. |
| 2004/0267768 | A1 | 12/2004 | Harjanto |
| 2005/0013419 | A1 | 1/2005 | Pelaez et al. |
| 2005/0018821 | A1 | 1/2005 | Darsin et al. |
| 2005/0025297 | A1 | 2/2005 | Finnigan |
| 2005/0091226 | A1 | 4/2005 | Lin et al. |
| 2005/0132266 | A1 | 6/2005 | Ambrosino et al. |
| 2005/0216421 | A1 | 9/2005 | Barry et al. |
| 2006/0059107 | A1 | 3/2006 | Elmore et al. |
| 2006/0072720 | A1 | 4/2006 | Blohm |
| 2006/0177005 | A1 | 8/2006 | Shaffer et al. |
| 2006/0177007 | A1 | 8/2006 | Vaghar et al. |
| 2006/0177008 | A1 | 8/2006 | Forney et al. |
| 2006/0177009 | A1 | 8/2006 | Skakkebaek et al. |
| 2006/0177011 | A1 | 8/2006 | Skakkebaek et al. |
| 2006/0177012 | A1 | 8/2006 | Forney et al. |
| 2006/0177014 | A1 | 8/2006 | Skakkebaek et al. |
| 2006/0177015 | A1 | 8/2006 | Skakkebaek et al. |
| 2006/0177023 | A1 | 8/2006 | Vaghar et al. |
| 2006/0177024 | A1 | 8/2006 | Frifeldt et al. |
| 2006/0223502 | A1 | 10/2006 | Doulton |
| 2006/0234680 | A1 | 10/2006 | Doulton |
| 2006/0274856 | A1 | 12/2006 | Dunn et al. |
| 2008/0175235 | A1 | 7/2008 | Frifeldt et al. |
| 2008/0198979 | A1 | 8/2008 | Skakkebaek et al. |
| 2008/0198980 | A1 | 8/2008 | Skakkebaek et al. |
| 2008/0198981 | A1 | 8/2008 | Skakkebaek et al. |
| 2008/0279350 | A1 | 11/2008 | Skakkebaek et al. |

FOREIGN PATENT DOCUMENTS

| | | | |
|---|---|---|---|
| WO | WO 2006/086335 A2 | 8/2006 | |
| WO | WO 2006/086335 A3 | 8/2006 | |

OTHER PUBLICATIONS

Official Action for U.S. Appl. No. 11/053,271, mailed Dec. 1, 2009.
Official Action for U.S. Appl. No. 11/053,147, mailed Dec. 9, 2009.
Official Action for U.S. Appl. No. 11/053,411, mailed Sep. 30, 2009.
Final Official Action for U.S. Appl. No. 12/016,365, mailed Oct. 13, 2009.
Official Action for U.S. Appl. No. 11/053,270, mailed Dec. 11, 2009.

Official Action for U.S. Appl. No. 11/053,411, mailed Mar. 16, 2010.
"Introducing Adomo MCS Voice Access to Microsoft Outlook/Exchange," Adomo, Inc., http://support.adomo.com/3.1/user/, for Sep. 2003 release.
"Administrator's Guide", Adomo, Inc., http://support.adomo.com/3.1/adminguide/, for Sep. 2003 release.
AdomoMCS, Mobile Communication Server™, Adomo Inc., undated, 2 pages.
CMP Media LLC, "Adomo Launches Mobile Communications Server," Computer Telephony, Apr. 2001.
International Search Report for International (PCT) Application No. PCT/US08/50835, mailed Mar. 31, 2008.
Written Opinion for International (PCT) Application No. PCT/US08/50835, mailed Mar. 31, 2008.
International Preliminary Report on Patentability for International (PCT) Application No. PCT/US08/50835, issued Aug. 26, 2009.
International Search Report for International (PCT) Application No. PCT/US2008/050840, mailed Apr. 15, 2008.
Written Opinion for International (PCT) Application No. PCT/US2008/050840, mailed Apr. 15, 2008.
International Preliminary Report on Patentability for International (PCT) Application No. PCT/US2008/050840, Issued Aug. 26, 2009.
International Search Report for International (PCT) Application No. PCT/US2008/050842, mailed Apr. 30, 2008.
Written Opinion for International (PCT) Application No. PCT/US2008/050842, mailed Apr. 30, 2008.
International Preliminary Report on Patentability for International (PCT) Application No. PCT/US2008/050842, issued Aug. 26, 2009.
Official Action for U.S. Appl. No. 11/053,376, mailed Jul. 19, 2006.
Official Action for U.S. Appl. No. 11/053,376, mailed Apr. 5, 2007.
Official Action for U.S. Appl. No. 11/053,376, mailed Nov. 16, 2007.
Official Action for U.S. Appl. No. 11/053,376, mailed Sep. 5, 2008.
Official Action for U.S. Appl. No. 11/053,539, mailed Aug. 11, 2006.
Official Action for U.S. Appl. No. 11/053,539, mailed May 14, 2007.
Official Action for U.S. Appl. No. 11/053,538, mailed Jul. 6, 2006.
Official Action for U.S. Appl. No. 11/053,538, mailed Mar. 22, 2007.
Official Action for U.S. Appl. No. 11/053,538, mailed Nov. 27, 2007.
Official Action for U.S. Appl. No. 11/053,736, mailed Aug. 19, 2008.
Official Action for U.S. Appl. No. 11/053,271, mailed Apr. 3, 2008.
Official Action for U.S. Appl. No. 11/053,271, mailed Jan. 7, 2009.
Official Action for U.S. Appl. No. 11/053,147, mailed Apr. 3, 2009.
Official Action for U.S. Appl. No. 11/053,411, mailed Apr. 23, 2008.
Official Action for U.S. Appl. No. 11/053,411, mailed Dec. 31, 2008.
Official Action for U.S. Appl. No. 12/016,365, mailed Nov. 10, 2008.
Official Action for U.S. Appl. No. 11/053,054, mailed Jun. 28, 2006.
Official Action for U.S. Appl. No. 11/053,054, mailed Nov. 15, 2007.
Official Action for U.S. Appl. No. 11/053,054, mailed Jun. 3, 2008.
Official Action for U.S. Appl. No. 11/053,054, mailed May 26, 2009.
Official Action for U.S. Appl. No. 11/053,425, mailed Jul. 10, 2008.
Official Action for U.S. Appl. No. 11/053,425, mailed Apr. 13, 2009.
Official Action for U.S. Appl. No. 11/053,270, mailed Apr. 3, 2009.
Official Action for U.S. Appl. No. 11/053,054, mailed Mar. 21, 2007.
Notice of Allowability for U.S. Appl. No. 11/053,271, mailed Jun. 3, 2010.
Official Action for U.S. Appl. No. 12/016,365, mailed Mar. 29, 2010.
Official Action for U.S. Appl. No. 11/053,147, mailed Jun. 25, 2010.
Official Action for U.S. Appl. No. 11/053,054, mailed Jun. 7, 2010.
Official Action for U.S. Appl. No. 11/053,411, mailed Sep. 20, 2010.
Notice of Allowability for U.S. Appl. No. 12/016,365, mailed Sep. 16, 2010.
Official Action for U.S. Appl. No. 11/053,054, mailed Dec. 29, 2010.

* cited by examiner

CACHING USER INFORMATION IN AN INTEGRATED COMMUNICATION SYSTEM

CROSS-REFERENCE

The present patent application is a Continuation of pending application Ser. No. 11/053,272, filed on Feb. 7, 2005, and is related to the following U.S. patent applications:

Integrated Multi-Media Communication System, U.S. application Ser. No. 11/053,271, invented by Jens Skakkebaek, Heine Frifeldt, and Anthony Shaffer, filed concurrently herewith;

Form-Based User Interface For Controlling Messaging, U.S. application Ser. No. 11/053,537, invented by Heine Frifeldt, Anthony Shaffer, and Willem R. B. Potze, filed concurrently herewith;

Controlling Messaging Actions Using Form-Based User Interface, U.S. application Ser. No. 11/053,146, invented by Heine Frifeldt, Anthony Shaffer, and Willem R. B. Potze, filed concurrently herewith;

Caching Message Information In An Integrated Communication System, U.S. application Ser. No. 11/053,147, invented by Shahriar Vaghar, Yang Wang, and Jens Skakkebaek, filed concurrently herewith;

Distributed Cache System, U.S. application Ser. No. 11/053,411, invented by Shahriar Vaghar, Yang Wang, and Jens Skakkebaek, filed concurrently herewith;

Integrating Messaging Server Directory Service With Communication System Voice Mail Message Interface, U.S. application Ser. No. 11/053,709, invented by Heine Frifeldt, David Formey, and Anthony Shaffer, filed concurrently herewith;

Improved Message Data Access In Multi-Media Communication System, U.S. application Ser. No. 11/053 736, invented by Jens Skakkebaek and Heine Frifeldt, filed concurrently herewith;

System And Method For Voicemail Privacy, U.S. application Ser. No. 11/053,054, invented by Anthony Shaffer, Heine Frifeldt and David Forney, filed concurrently herewith;

Networked Voicemail, U.S. application Ser. No. 11/053, 425, invented by David Forney, Jens Skakkebaek, Heine Frifeldt, and Anthony Shaffer, filed concurrently herewith;

Extensible Diagnostic Tool, U.S. application Ser. No. 11/053,270, invented by David Forney, Heine Frifeldt, and Anthony Shaffer, filed concurrently herewith;

System And Method For Providing Data On Voicemail Appliance, U.S. application Ser. No. 11/053,538, invented by Jens Skakkebaek and Lutz Birkhahn, filed concurrently herewith;

Integrated Voice Mail User/Email System User Setup in Integrated Multi-Media Communication System, U.S. application Ser. No. 11/053,539, invented by Heine Frifeldt, David Forney, and Anthony Shaffer, filed concurrently herewith; and System And Method For Providing Code On Voicemail Appliance, U.S. application Ser. No. 11/053,376, invented by Jens Skakkebaek and Lutz Birkhahn, filed concurrently herewith.

Each of the foregoing applications is incorporated herein by reference in its entirety.

TECHNICAL FIELD

The disclosure herein relates generally to communication systems, and more particularly to integrated communication and messaging systems.

BACKGROUND

As methods of communication continue to proliferate, enterprises continue to desire integrated systems for handling all aspects of multi-media communication for enterprise users. An enterprise can be any collection of users of communication media having some common purpose, but a typical example is a company with one or more sites and some number of employees who are users of communication media. Communication media include electronic mail ("email") messaging, Short Messaging Service ("SMS") messaging, voice messaging, and more. Users receive and send messages over a variety of wired and wireless networks via a variety of devices, such as desktop computers, wired phones, wireless devices (e.g., phones and personal digital assistants ("PDAs")), and more.

Enterprises currently have the ability to centralize and manage email messaging using commercially available groupware that centrally stores information about all of the users and their messages. Enterprises also have the ability to centrally manage traditional voice messaging using a Private Branch Exchange ("PBX"). However, the systems for managing email messaging and the systems for managing voice mail messaging are not at all well integrated. For example, when a new user is added to the enterprise, a system administrator for the enterprise sets up the user in the email system using the groupware application and its set methods, data and protocols. In addition, a different administrator specializing in telephony must set up the user in the voice messaging system using different methods, data and protocols. Voice data and email data are typically stored in separate databases. Both initial user setup and updating user information are complicated by the fact that the email and voice systems are so distinct.

The management of and access to the voice mail message information and email information in the enterprise is also complicated by the current lack of integration of the two (voice and email) systems. There are various challenges to be overcome if one were to attempt to integrate the two systems.

INCORPORATION BY REFERENCE

All publications and patent applications mentioned in this specification are herein incorporated by reference to the same extent as if each individual publication or patent application was specifically and individually indicated to be incorporated by reference.

Figure 1:
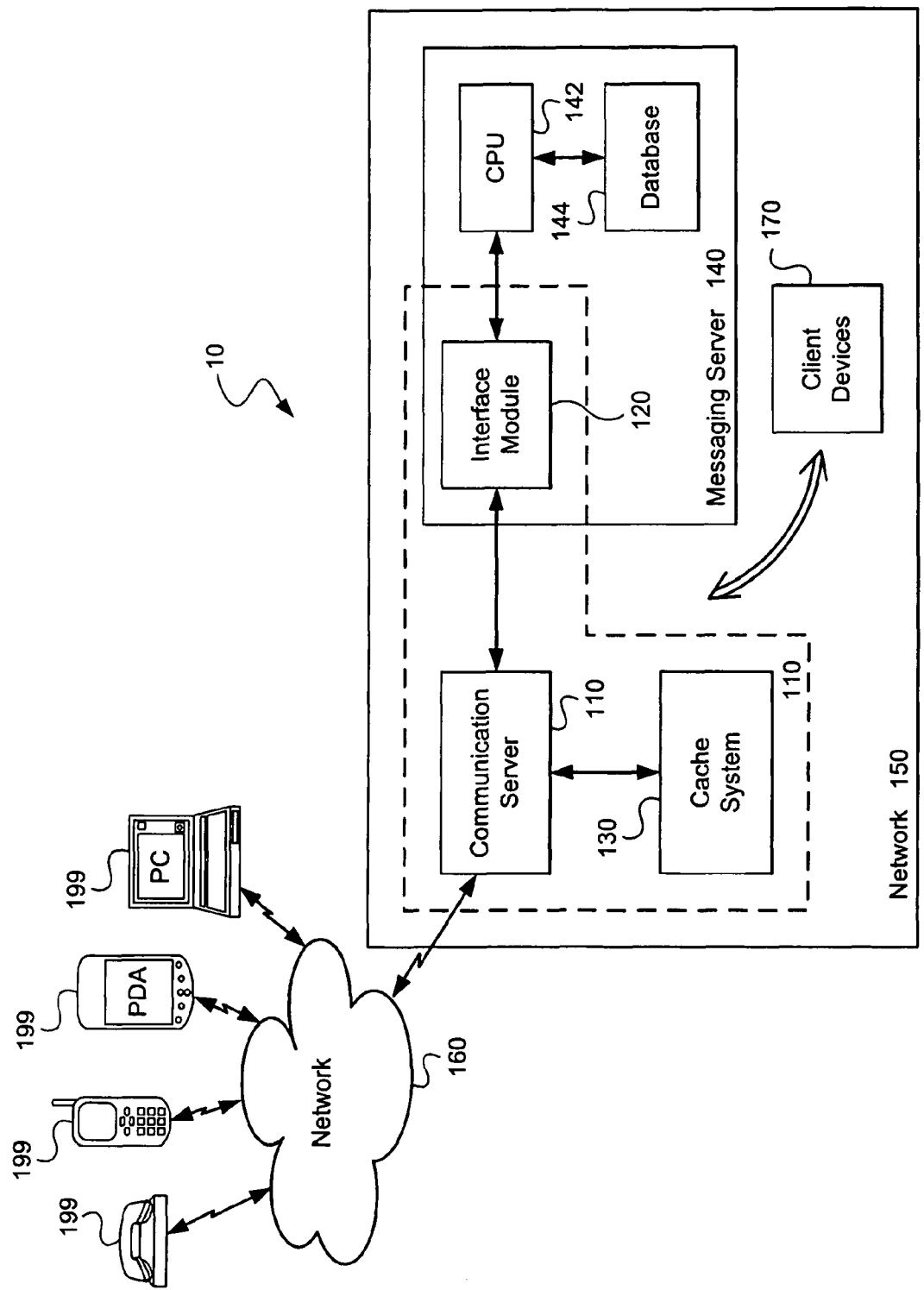
FIG. 1 is a block diagram of a system that includes an integrated communication system ("ICS"), under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 110 is first introduced and discussed with respect to FIG. 1).

DETAILED DESCRIPTION

Integrated multi-media communication systems and methods are provided below. These communication systems and methods, collectively referred to herein as "integrated communication systems" or "ICS," integrate different types of messaging so that a user of the ICS can access multiple types of messages (e.g., voice mail messages, electronic mail, email messages, instant messaging messages, SMS (Short Messaging System) messages, MMS (Multimedia Messaging System) messages, etc. with a single message interface. In providing integrated messaging functionality via a single message interface, the ICS of an embodiment relieves the dependency of a voice mail system, for example, by providing users with access to voice mail messages and capabilities of the voice mail system through the local groupware applications and email messaging system.

The ICS generally includes a communication server, a cache system, and an interface module. The ICS integrates with a messaging and collaboration system and the corresponding groupware applications in a network environment for example. In providing integrated messaging capabilities, the communication server and interface module function to route a call received from a caller to a user and, in the event the user is not available, to receive and route a voice mail message left by the caller. The ICS uses caching processes during the receiving and routing of voice mail messages that provide users with fast access to voice mail messages, user information and contact information. Using caching process, the ICS also provides access to the voice mail messaging system during periods when the messaging and collaboration system is offline. The ICS also leverages the storage capability of the messaging and collaboration system to eliminate the need for a separate voice mail database.

The message interface of the ICS includes a form-based interface for use in retrieving voice mail messages and controlling actions taken on voice mail messages received in the enterprise network system. This form-based interface enables a user to retrieve and take various actions on voice mail messages using data of a form provided to the user's client device by the enterprise network email system. Use of the form-based interface thus provides users with access to the integrated messaging functions offered by the ICS without a requirement to install or run a dedicated client application on the user's client device.

In the following description, numerous specific details are introduced to provide a thorough understanding of, and enabling description for, embodiments of the ICS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 is a block diagram of a system 10 that includes an integrated communication system ("ICS") 100, under an embodiment. ICS 100 includes a communication server 110, an interface module ("IM") 120, and a cache system 130 (also referred to as the "cache"), but is not so limited. Communication server 110 couples to components of any number of networks 150 and 160 using any of a variety of communication protocols, where networks 150 and 160 may be of the same or of different types. Networks 150 and 160 allow for information transfers between various client devices 170 and 199, also referred to as user devices 170 and 199.

IM 120 of ICS 100 couples to transfer information or data with communication server 110. Additionally, IM 120 couples to transfer information with one or more components of a messaging server 140, where transferring information includes one or more of pulling, receiving, retrieving, polling, transmitting, and pushing operations, to name a few. As an example of an information transfer between IM 120 and messaging server 140, IM 120 pulls user information from messaging server 140 and makes the pulled user information available to other components of ICS 100, wherein the user information includes information relevant to at least network 150.

The components of messaging server 140 may include for example one or more processors 142, also referred to as "central processing units" or "CPUs," and one or more databases 144 coupled to CPU 142. In an embodiment, IM 120 may be hosted on or running under control of messaging server 140, but is not limited to this configuration. Further, messaging server 140 may be a component of network 150 that hosts communication server 110, but is not so limited. For example, messaging server 140 may be hosting a groupware application (e.g., Microsoft Exchange, LotusNotes, etc.) of an enterprise network 150.

Cache 130 couples to communication server 110 and communicates to transfer information with one or more of communication server 110, IM 120, and one or more components of messaging server 140, as described below. Cache 130 may also couple to additional components (not shown) of network 150.

As an example of information transfers between cache 130 and communication server 110, cache 130 may receive caller information (e.g., voice mail messages, caller identification, etc.) from client devices 199 via communication server 110. An example of information transfers between cache 130 and messaging server 140 includes transfers in which cache 130 receives user information from messaging server 140, where the user information may be routed from messaging server 140 via IM 120 and/or communication server 110. Another example of information transfers between cache 130 and messaging server 140 includes transfers in which messaging server 140 receives information from cache 130 routed from cache 130 via communication server 110 and/or IM 120.

Examples of information transfers between cache 130 and IM 120 include transfers of user information pulled from messaging server 140 by IM 120 and directed to cache 130, and transfers in which IM 120 directs a message from at least one of messaging server 140 and cache 130 to at least one device on networks 150 and 160 using the user information. Cache 130 holds or temporarily stores the received information under the above examples.

Networks 150 and 160 include various network components (not shown) of one or more communication service providers or carriers, but are not so limited. Further, networks 150 and 160 and corresponding network components can be any of a number/combination of network types known in the art for providing communications among coupled devices 170 and 199 including, but not limited to, proprietary networks, local area networks ("LANs"), metropolitan area networks ("MANs"), wide area networks ("WANs"), backend networks, public switched telephone networks ("PSTN"), the Internet, and other public networks for example. Additionally, networks 150 and 160 may include hybrid networks that use a proprietary network for some portion of the communications routing, for example, while using one or more different public networks for other portions of the communications routing.

Client devices 170 and 199 include communication devices like telephones, cellular telephones, and radio telephones. Client devices 170 and 199 also include processor-based devices like, for example, portable computers ("PC"), portable computing devices, personal digital assistants ("PDA"), communication devices, cellular telephones, portable telephones, portable communication devices, and user devices or units. Client devices can include so-called multi-modal devices, where the user can interact with the device and/or the ICS through any form of input and output, such as text input, speech recognition, text output, text-to-speech, graphics, recorded files and video. In such devices, the speech recognition and text-to-speech generation may partly take place in the device and partly in the ICS. Sound and/or video may be generated by the ICS by a continuous stream of sound and/or video data sent to the device. Client devices can include all such devices and equivalents, and are not limited to any particular type of communication and/or processor-based device. In an embodiment client devices 170 are client devices operating in a private network environment like an enterprise network, while client devices 199 are client devices operating in different private network environments or under any number of public networks.

Figure 2:
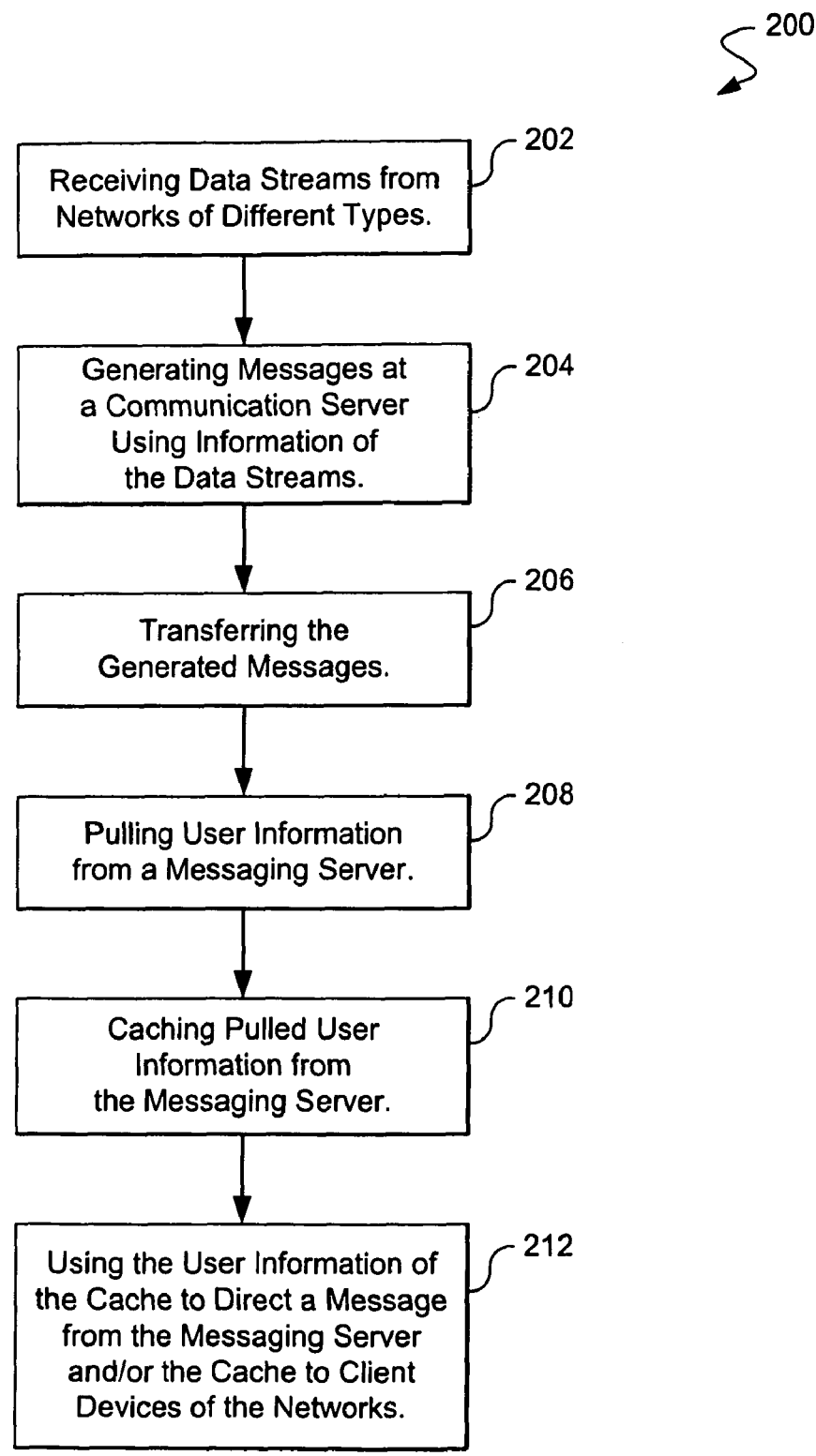
FIG. 2 is a flow diagram for providing integrated communication processes using the ICS, under an embodiment.

FIG. 2 is a flow diagram for providing integrated communication processes 200 using ICS 100, under an embodiment. Processes 200 include receiving data streams from networks of different types, at block 202. The data streams may include a variety of data including, for example, audio or voice data. Further, the data streams may be received from any number of networks or client devices operating on the networks. Processes 200 further include generating messages at a communication server using information of the data streams, at block 204. The generated messages may be any of a number of message types. Returning to the above example in which the received data stream includes audio data, the generated message is a voice mail message, but is not so limited. Processes 200 also include transferring the messages, at block 206. The transferring operation includes for example caching information of the messages in the ICS cache and/or forwarding the messages to a messaging server.

Continuing, processes 200 include pulling user information from a messaging server coupled to the ICS, at block 208, as described above. The user information includes information relevant to users of at least the network hosting the ICS, but is not so limited. Processes 200 also include caching pulled user information from the messaging server, at block 210. Additionally, processes 200 include use of the user information of the cache to direct a message from at least one of the messaging server and the cache to one or more client devices on any of the networks, at block 212.

The ICS of an embodiment integrates different types of messaging so that a user of the ICS can access all of the message types (e.g., voice mail messages, electronic mail or email messages, etc.) with a single message interface (also referred to as a "user interface" or "UI"). In providing integrated messaging functionality via a single message interface, the ICS of an embodiment relieves the dependency on a voice mail system with a dedicated voicemail and user database, for example, by providing users with access to voice mail messages and capabilities of the voice mail system through the local email messaging system.

Figure 3:
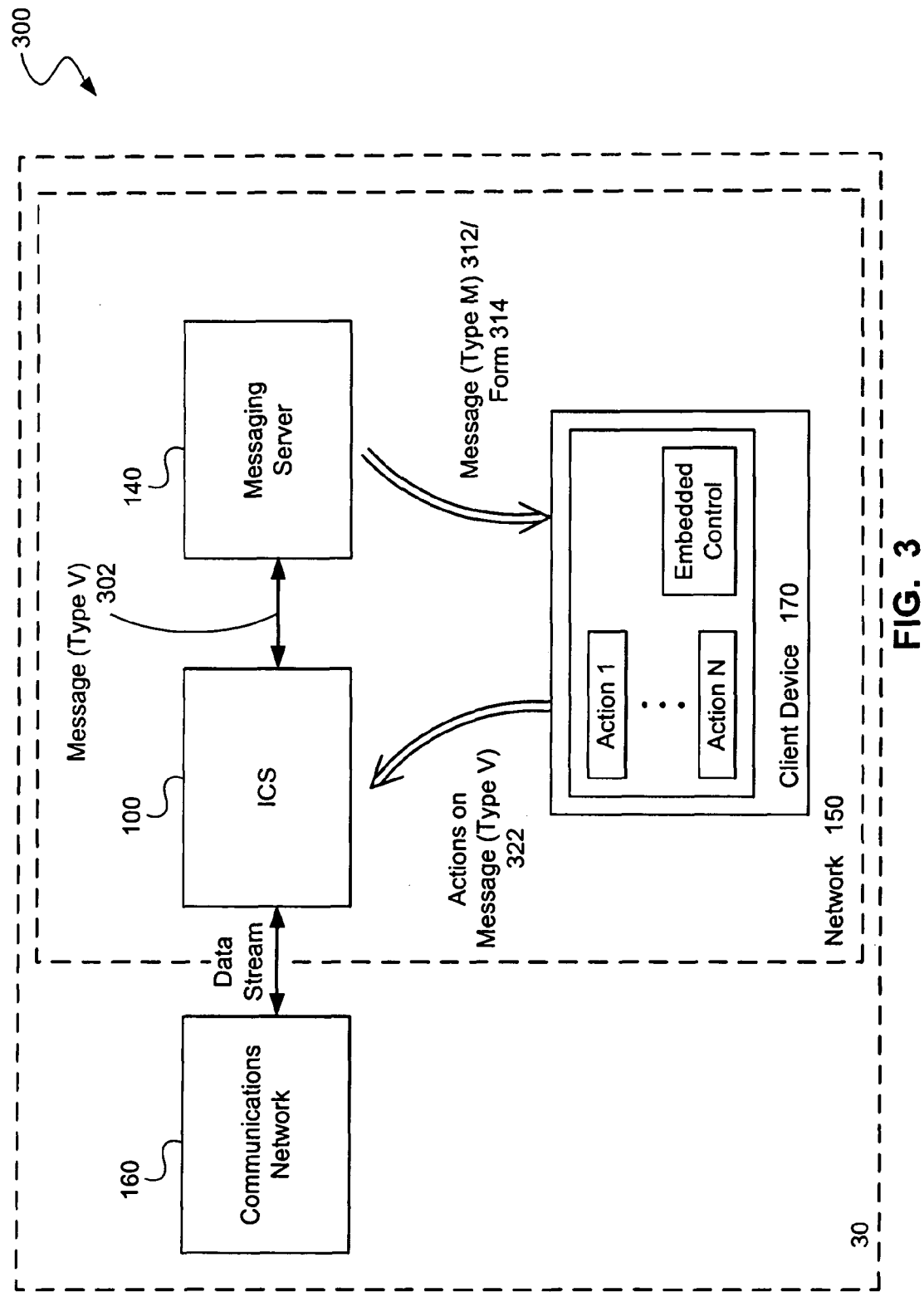
FIG. 3 is a block diagram of example information flows in a system that includes the ICS, under an embodiment.

FIG. 3 is a block diagram of example information flows 300 in a system 30 that includes ICS 100, under an embodiment. The system also includes a messaging server, 140 and any number of client devices 170 that couple to ICS 100. In addition, ICS 100 couples to a communications network 160. ICS 100, messaging server 140, and client devices 170 may be hosted under a network 150, but are not so limited. System 30 is shown with one each of ICS 100, messaging server 140, and client device 170 for purposes of this description, but may include any number of each of ICS 100, messaging server 140, and client device 170 coupled in any combination. System 30 may also couple to one or more other systems (not shown) or networks via any number of backend couplings (not shown)

Components of ICS 100 include a communication server and an interface (not shown). The interface of ICS 100 may run under control of messaging server 140, as described above, but is not so limited. Information flow 300 begins when, in response to receiving data streams from networks 160 of different types, ICS 100 generates a first message 302 and transfers first message 302 to messaging server 140 via a communication with messaging server 140. First message 302 may be a voice mail message ("Voice Mail Type" or "VMT") but is not limited to this type of message. For purposes of the description herein, a voice mail message is left by a "caller" to the ICS. For example, in an embodiment where Microsoft Exchange is the messaging server 140, the VMT may be implemented using "Message Class" and/or "Message Type" fields associated with messages in Microsoft Exchange.

Following or simultaneous with receipt of first message 302, the messaging server 140 detects or identifies a type of first message 302 using information of the first message and generates a second message 312. Second message 312 is of a different type from that of first message 302, and includes information of first message 302. Second message 312 may for example be an email message but is not limited to this type of message. Second message 312 is transferred to a client device 170 via a communication with client device 170, where the communication uses a communication protocol of network 150.

Responsive to receipt of second message 312, client device 170 determines a type of the second message and requests form data 314 that corresponds to second message 312. Messaging server 140, in response to the request for form data 314, transfers form data 314 to client device 170 via the second coupling. One or more components of ICS 100 generate and/or provide form data 314 for storage in messaging server 140, and form data 314 is generated under the communication infrastructure of network 150. The form data may be displayed to the user using the corresponding form.

Client device 170 uses form data 314 to view contents of second message 312. The client device also uses form data 314 to establish communications with communication server 110 (of ICS 100) via a third coupling. The communication protocol of the third coupling is different than the communication protocol of the second coupling, but is not so limited. An "embedded control" controls activation of the third coupling. Furthermore, the client device allows a "user" using the client device to direct actions 322 on first message 302 via the third coupling with the ICS using the form data. For purposes of the description herein, a "user" is an individual with enabled capability to use functions within the ICS.

Figure 4:
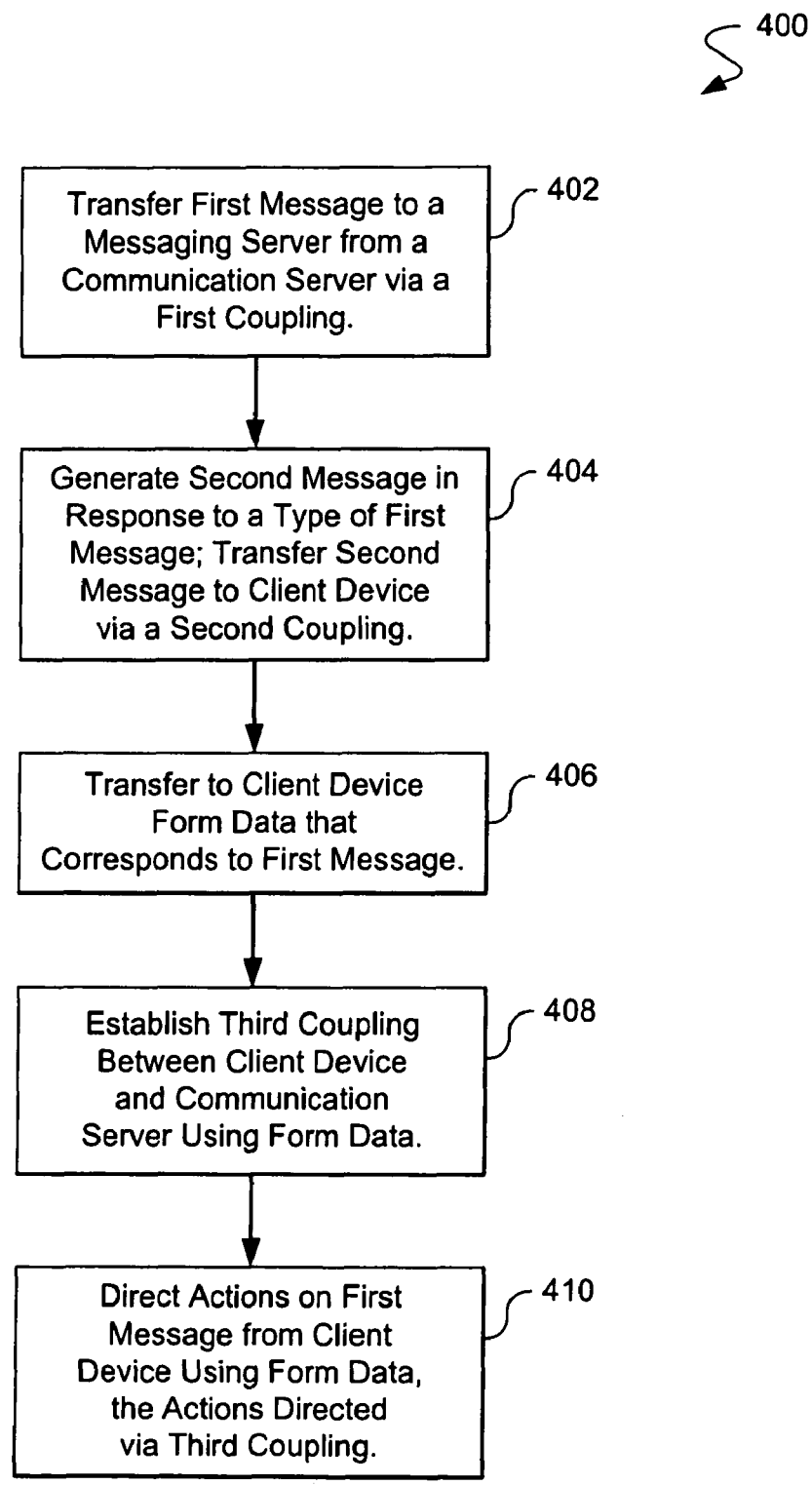
FIG. 4 is another flow diagram for providing integrated communication processes using the ICS, under an embodiment.

As an example under information flows 300, FIG. 4 is a flow diagram for integrated communication processes 400 using ICS 100, under an embodiment. Processes 400 include transferring a first message to a messaging server from a communication server via a first coupling, at block 402. Processes 400 also include generating a second message at the messaging server in response to a type of the first message and transferring the second message to a client device via a second coupling, at block 404. The second message may be of a different type than the first message and includes data of the first message. Processes 400 further include transferring to the client device form data that corresponds to the first message, at block 406. Additionally, processes 400 include establishing a third coupling between the client device and the communication server using the form data, at block 408. Moreover, processes 400 include directing actions on the first message from the client device using the form data, the actions directed via the third coupling, at block 410.

The ICS of an embodiment integrates messages of different types to enable a user to access a number of message types through components of the ICS. Thus, an application of the ICS of an embodiment is as a substitute for a voice mail system in an enterprise network, where the ICS enables a user to receive and/or take action on voice mail messages using the enterprise email system.

Figure 5:
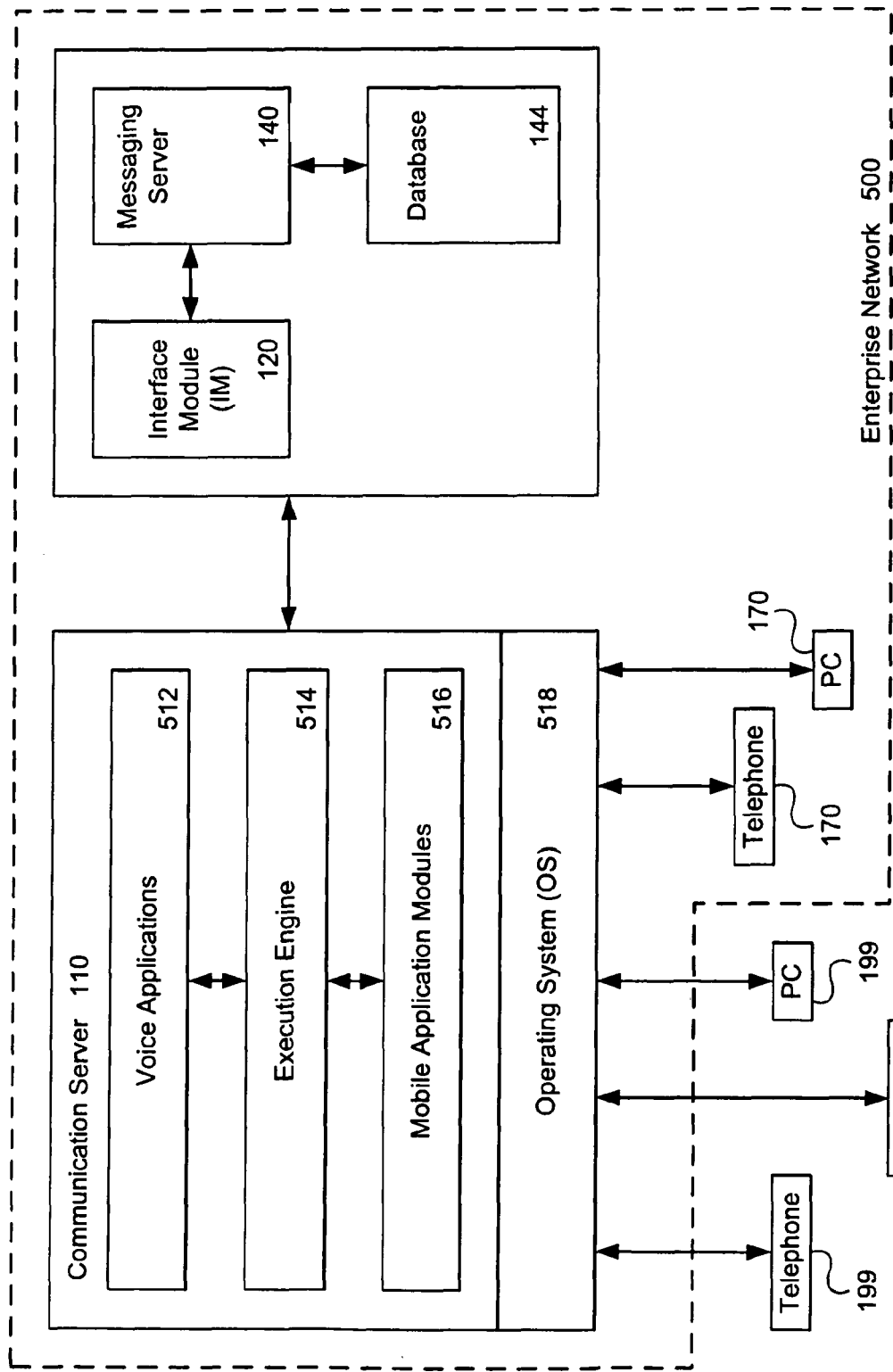
FIG. 5 is a block diagram of an enterprise network system that includes a communication server and Interface Module ("IM") of an ICS, under an embodiment.

FIG. 5 is a block diagram of an enterprise network system 500 that includes a communication server 110 and IM 120 of an ICS, under an embodiment. Communication server 110 couples to at least one messaging server 140 via IM 120. IM 120 runs under messaging server 140, but is not limited to running under this server. Messaging server also couples to one or more databases 144. Messaging server 140 of an embodiment supports the messaging capabilities of enterprise network system 500 using a groupware application (e.g., Microsoft Exchange) (not shown) along with other applications as appropriate to the size and type of enterprise network system 500. Messaging server 140, database 144, and groupware application (not shown) may be referred to as collectively forming a "messaging environment."

Communication server 110 couples to any number of client devices 199 external to enterprise network 500 via one or more networks (not shown), as described above with reference to FIG. 1. Similarly, communication server 110 couples to any number of client devices 170 local to enterprise network 500.

Communication server 110 includes an operating system 518 as well as numerous components or subsystems. These components include but are not limited to one or more Voice Applications 512, an Execution Engine 514, and any number of Mobile Application Modules 516, as described below, or any other type of application module.

Figure 6:
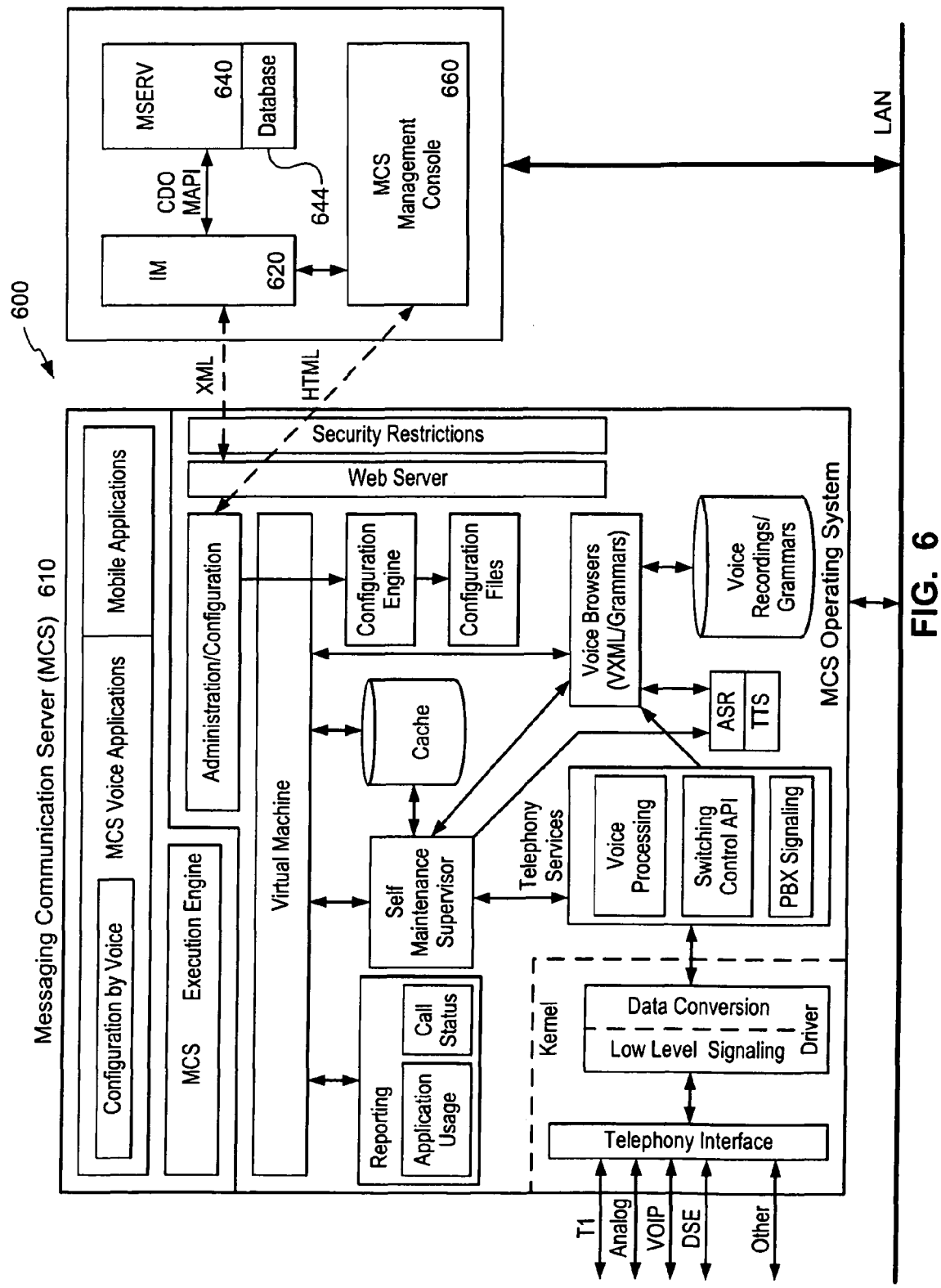
FIG. 6 is a block diagram of an enterprise network system that includes the ICS, under an embodiment.

FIG. 6 is a block diagram of an enterprise network system 600 that includes an ICS, under an embodiment. The ICS includes a communication server 610 as described above, also referred to as a "Messaging Communication Server" or "MCS." The MCS may be highly scalable. According to an embodiment of the invention, the MCS may be configured as a modular "appliance" that is essentially self-contained, and may be, for example, encased in a stackable, "pizza-box" style server. The ICS also includes IM 620 (also referred to herein as the "IM") and a Management Console 660. The IM, which in one embodiment runs under control of a messaging server 640 (also referred to herein as "MSERV 640" or "MSERV"), couples to components of the MCS, the MSERV, and a Database 644 (also referred to herein as a "Database") in a number of sequences as described herein and as appropriate to enterprise network system 600. The IM also couples to MCS Management Console 660. The MCS and the MSERV couple to the LAN for communication with other components (not shown) of enterprise network system 600.

The MCS of an embodiment includes an "Operating System" along with an "Execution Engine," some number of "Voice Applications," and some number of "Mobile Applications." The Operating System includes for example a Linux kernel with a journaling file system that provides integrity of file system tables and the data structure. The storage on the MCS may be configured as a RAID (Redundant Array of Independent Disks) configuration to provide high reliability access to software and data. The Operating System supports operations of numerous other components of the MCS as described below.

With regard to the Operating System, the MCS includes a "Telephony Interface" that couples calls and connects callers and users to/from the MCS. The Telephony Interface couples call information to/from a private branch exchange ("PBX") (not shown) for example, where the PBX is a component of enterprise network system 600. The Telephony Interface couples to the PBX using a variety of telephony integrations that include one or more of analog, Simplified Message Desk Interface ("SMDI"), T1/E1, Voice over Internet Protocol ("VoIP"), and Digital Set Emulation ("DSE") signals, but may couple using other signals/signaling protocols. When receiving a call from the PBX, for example, the MCS receives data of an incoming call from the PBX, where the data includes called party information, a reason for transfer of call (e.g., called party line busy, no answer by called party, called party using call forwarding, etc.), and calling parting information (caller ID, etc.).

A "Driver" couples information received at the Telephony Interface to the "Telephony Services" component of the MCS. The Driver may perform low level signaling and/or data conversion as appropriate to the received signals. The Telephony Services include one or more components for use in processing the received signals. These components include, for example, voice processing, switching/control, and PBX signaling, but are not limited to these components.

The MCS of an embodiment includes at least one "Voice Browser" that, when the MCS receives a call, receives voice information of the call. The Voice Browser controls the use of automatic speech recognition ("ASR") for speech recognition and DTMF recognition. The Voice Browser of an embodiment couples to a cache or other temporary store that holds voice recordings and/or name grammars ("Voice Recordings/Grammars") (the name grammars are cached after being generated from names in a user list, as described below). The ASR may use information of the name grammars. Further, the Voice Browser controls the use of text-to-speech ("TTS") as well as the play of any number of pre-recorded prompts (e.g., WAVE format files). The Voice Browser uses voice extensible markup language ("VXML") but is not limited to this protocol. Alternative embodiments of the MCS may not include the Voice Browser. As an alternative to a Voice Browser, the MCS may directly communicate with, or use other software or processes, for communication between the voice application and the Telephony Services and/or Driver.

The Virtual Machine, Voice Applications, and Execution Engine form a hierarchical state machine framework in which the Virtual Machine runs a number of APIs and modules. Consequently, the Voice Applications can include one component controlling the user interfaces ("UI") to the MCS, and another component handling lower-level communications with the modules. Use of a loose coupling between the modules and the Voice Browser provided by the state machine framework allows independence between the languages used in the different modules and the Voice Browser. The state machine framework may receive hypertext transport protocol ("HTTP") requests from the Voice Browser, for example, and generate VXML or Speech Application Language Tags ("SALT") (SALT extends existing mark-up languages such as hypertext markup language ("HTML"), extensible hypertext markup language ("XHTML"), and extensible markup language ("XML"), and enables multimodal and telephony-enabled access to information, applications, and web services from devices like PCs, telephones, and PDAs for example).

The Voice Applications of an embodiment include a number of components including an automatic attendant, a caller interface, a user interface, and a system main menu, but may include other types of voice applications. The automatic attendant is speech enabled, but may be dual tone multi-frequency ("DTMF")-enabled. The automatic attendant, which can be enabled or disabled, uses information of contact lists (e.g., User List) in the Cache.

The Voice Applications also include at least one voice mail application. The voice mail application uses information of the Cache (e.g., User List, Global Address List, Public Folders, Personal Contact Folders) in operations that include sending a new voice mail and/or forwarding a received voice mail. The voice mail application also uses Cache information in support of voice mail networking in which voice mails and corresponding information are exchanged with groupware applications of enterprise network system 600, as described below.

The voice mail application couples to the MCS state machine framework described above via one or more application programming interfaces ("API"). The APIs handle the different data formats/types in use by enterprise network system 600 (e.g., greeting data, PIN (Personal Identification Number) code data, voice mail message data, system parameters, etc.). Similarly, the Cache also couples to the state machine framework, where the Cache includes one or more of local cache and distributed cache. Therefore, communications among the voice mail application, the Cache, and the MSERV take place via the state machine framework and the APIs as appropriate to the state (e.g., offline, online) of the MSERV.

In addition to the Voice Applications, the modules running under the Virtual Machine of an embodiment include Mobile Applications. The Mobile Applications provide access to user information via mobile devices, where the access may include transferring information of email, calendar, and/or contacts to a user's mobile client device via an electronic message (e.g., SMS, MMS, and/or pager).

The MCS also includes an "Administration/Configuration" manager. The Administration/Configuration manager provides access to and control of a unified configuration file of the MCS. The Administration/Configuration manager uses information of the unified configuration file to provide separate Configuration Files to one or more of the components of the MCS as appropriate. The unified configuration file can be copied from the MCS and stored for backup purposes. Additionally, a predefined configuration file may be uploaded to the MCS to provide the appropriate configuration for the MCS. A browser interface to the Administration/Configuration manager allows remote access to the MCS.

The MCS also includes a "Self Maintenance Supervisor" or reliability server that monitors MCS components and restarts failed processes when necessary, for example. In addition, the MCS also includes "Security Restrictions" for use in controlling MCS/port security.

As described above, the MCS of an embodiment interfaces with the MSERV via the IM. The MCS communicates with the IM via the Groupware Connector for example, but is not so limited. The Groupware Connector of an embodiment includes a "Web Server," but is not so limited. The MSERV functions as a messaging and collaboration server. The IM is an interface that runs under the MSERV in one embodiment to provide communications and information transfers between components of the MCS and components of the MSERV. In other embodiments, the IM may run under control of the MCS, for example. The IM includes and/or couples with Management Console 660 as well as with a diagnostics component ("Diagnostics Component") and/or a run time component ("RTC") (not shown).

Management Console 660 supports access to the MCS by a system administrator of enterprise network system 600 for purposes of managing user access. Consequently, Management Console 660 allows a system administrator to enable new users with integrated messaging functionality of the ICS and administer and monitor one or more MCSs.

The Diagnostics Component of the IM supports on-the-fly diagnostics gathering, computing, and/or compiling of pre-specified diagnostics information or parameters from the MSERV. In this manner the MCS may provide diagnostics information and a user may provide dynamically updateable diagnostics information.

The RTC translates communications between components of the MCS and components of the MSERV. As an example the RTC may be used to retrieve user information from the directory service (e.g., Active Directory) of a groupware application in response to a request from the MCS, as described below. Communications between the RTC and components of the MCS use for example XML and Web Services. Communications between the RTC and the MSERV may use one or more APIs of the MSERV (e.g., MAPI, Collaboration Data Objects ("CDO"), Web Distributed Authoring and Versioning ("WebDAV"), etc.).

The MSERV of an embodiment represents a messaging and collaboration server. The messaging and collaboration server includes a groupware application that runs on one or more servers and enables users via local client devices to send and/or receive electronic mail and other forms of interactive communication through computer networks. The MCS of an embodiment interoperates with groupware applications that include, but are not limited to, Microsoft Exchange Server, but alternative embodiments may use other types of messaging and collaboration servers. Therefore, the MCS of an embodiment interoperates with client device applications ("client applications") such as Microsoft Outlook, as well as with other email client applications (e.g., Microsoft Outlook Express).

The MSERV sends and receives email messages through what is commonly referred to as a client device such as a personal computer, workstation, or a mobile device including mobile phones or PDAs. The client device typically connects to the LAN, which may include any number and/or combination of servers or mainframe computers where the email mailboxes and public folders are stored. The centralized servers connect to numerous other types of networks (e.g., private or proprietary, and the Internet) to transmit and receive email messages to other email users. Consequently, the MCS uses the MSERV for storing and forwarding email messages in an embodiment.

The MSERV also couples to a directory service (not shown), which is a database of information on each user account in the enterprise network system. Access to the directory service may use for example a Lightweight Directory Access Protocol ("LDAP").

With regard to client device access functionality, the MSERV provides integrated collaborative messaging features such as scheduling, contact, and task management capabilities. As an example MSERV configuration, when the MSERV is Microsoft Exchange, the MSERV runs on a version of the Microsoft Windows Server operating system. A version of Microsoft Office Outlook runs on Windows-based local client devices and communicates with the MSERV through the messaging application programming interface ("MAPI") protocol. The MSERV also accommodates other client device access by supporting one or more of Post Office Protocol 3 ("POP3") and Internet Message Access Protocol 4 ("IMAP4") protocols as well as support for Simple Mail Transfer Protocol ("SMTP"). Using this same MSERV configuration example, the MCS of an embodiment, along with Microsoft Outlook Web Access (a service in Microsoft Exchange) accommodates web browser-based access clients, also referred to as thin clients.

The MSERV collaboration features support information sharing among users. Collaborative scenarios include maintaining shared address lists that all users can view and edit, scheduling meetings that include people and conference rooms by viewing associated free or busy schedules, the ability to grant other people, such as administrators, access to user mailboxes on behalf of the user.

As described above, the IM serves as an interface for the transfer of information between components of the MCS and components of the MSERV. Transferring information includes for example pulling, receiving, retrieving, polling, transmitting, and pushing operations, to name a few. As an example of information transfers between the MCS and the MSERV, the IM pulls information from one or more components of the MSERV and makes the pulled information available to, for example, the MCS Cache. The IM also pushes information from one or more components of the MCS to the MSERV.

In serving as an interface between the MCS and the MSERV, the components of the IM (e.g., RTC) translate communications between components of the MCS (e.g., Virtual Machine, Cache, etc.) and components of the MSERV environment. As an example the IM retrieves user information from components of the directory service (e.g., Active Directory) in response to a request from the MCS/Cache.

Embodiments of the IM may include one or more of the following components: an RTC, a Management Console, a desktop component, messaging actions control component, Diagnostics Component and/or a message waiting indication component. The desktop component allows the user to configure aspects of the user's integrated messaging account, such as voice message greetings, extended absence greeting, PIN code data, and presence information. The messaging actions control component receives and responds to user generated requests from the FBUI (defined herein) to take actions such as playing, replaying to and forwarding voice messages, as well as calling the sender of a voice mail message. The message waiting indication component receives events from the user's message inbox folder and requests corresponding action from the PBX or other aspect of the telephony system, such turning on message waiting indicators on the user's device(s). The message waiting indication component may send notifications by way of SMS, MMS and/or pager MSERV 640 and database 644 are typically part of an enterprise MSERV environment that includes multiple MSERVs and multiple databases in the same or various locations. Typically included in the MSERV environment is a directory service that includes a database. In some configurations, the directory service may be included in database 644. Database 644 can represent storage capability for the enterprise, and can be distributed in any manner. A directory service provides a location for storage of information about network-based enterprise entities, such as applications, files, and printers to name a few. The directory service also stores information about individuals, also referred to as users, and this information is referred to herein as "user information." As such the directory service provides a consistent way to name, describe, locate, access, manage, and secure information about individual resources in an enterprise network environment. The directory service uses the stored information to act as the main switchboard of the enterprise network operating system and is therefore the central authority that manages the identities and brokers the relationships between distributed resources of the enterprise network, thus enabling the resources to work together. Directory services are available from several vendors, for example Microsoft Corporation offers the Active Directory ("AD") directory service, and IBM offers a Distributed Computing Environment ("DCE") directory service.

Figure 7:
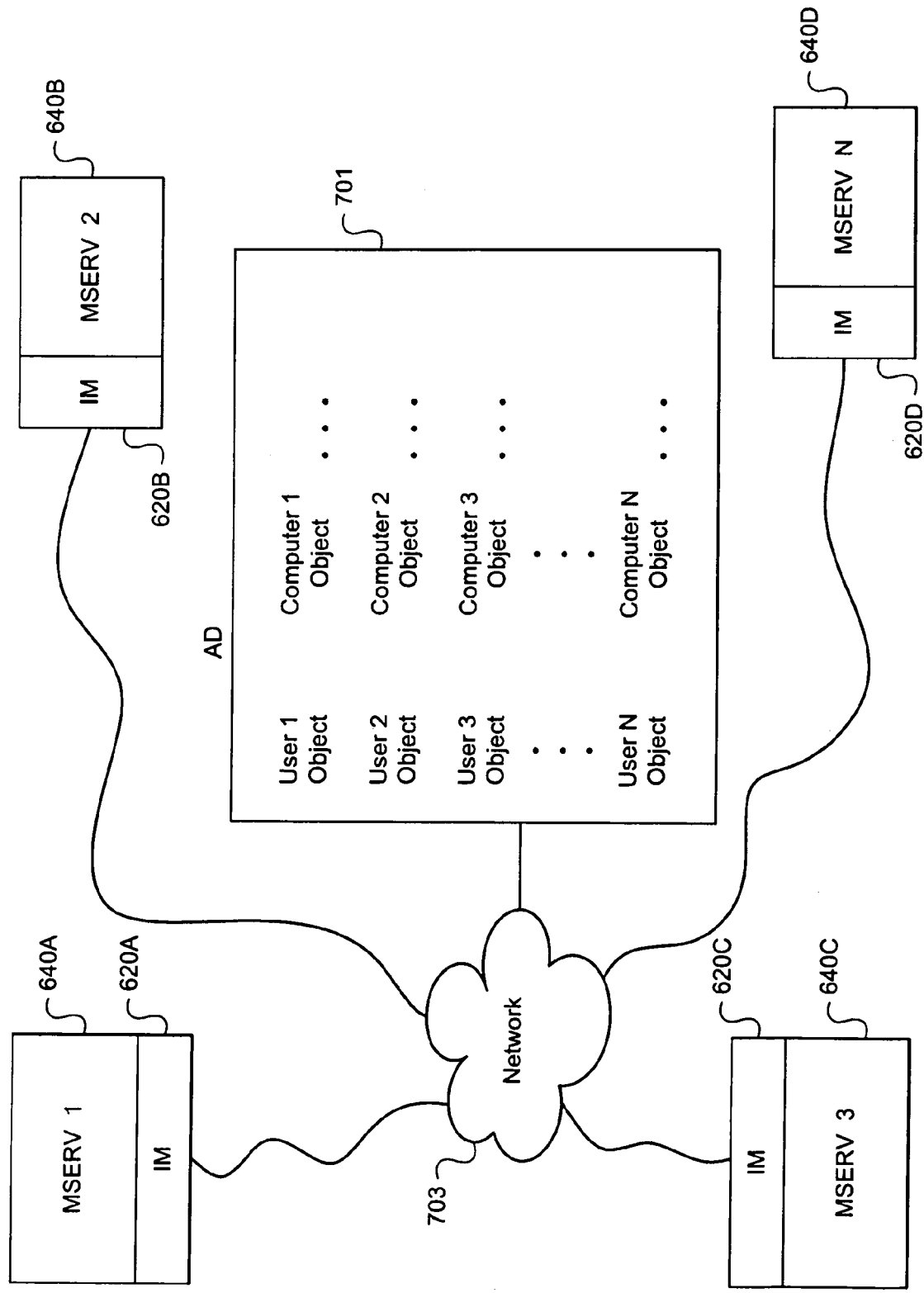
FIG. 7 is a block diagram of an embodiment in which the enterprise includes multiple MSERVs, each of which communicates with a respective IM of an ICS, under an embodiment.

FIG. 7 is a block diagram of an embodiment in which the enterprise includes multiple MSERVs 640A through 640D, each of which communicates with a respective IM of IMs 620A through 620D. In one embodiment, the enterprise includes an AD 701, which communicates with each MSERV 640 through a network 703 as shown. Network 703 can include one or more networks, including but not limited to local area networks (LANs) and the Internet.

AD 701 includes many objects each of which includes data for one particular network-based entity. For example, AD 701 includes user objects for each user, shown here as User 1, User 2, etc. Similarly, AD 701 includes computer objects for each computer, shown here as computer 1, computer 2, etc.

Figure 8:
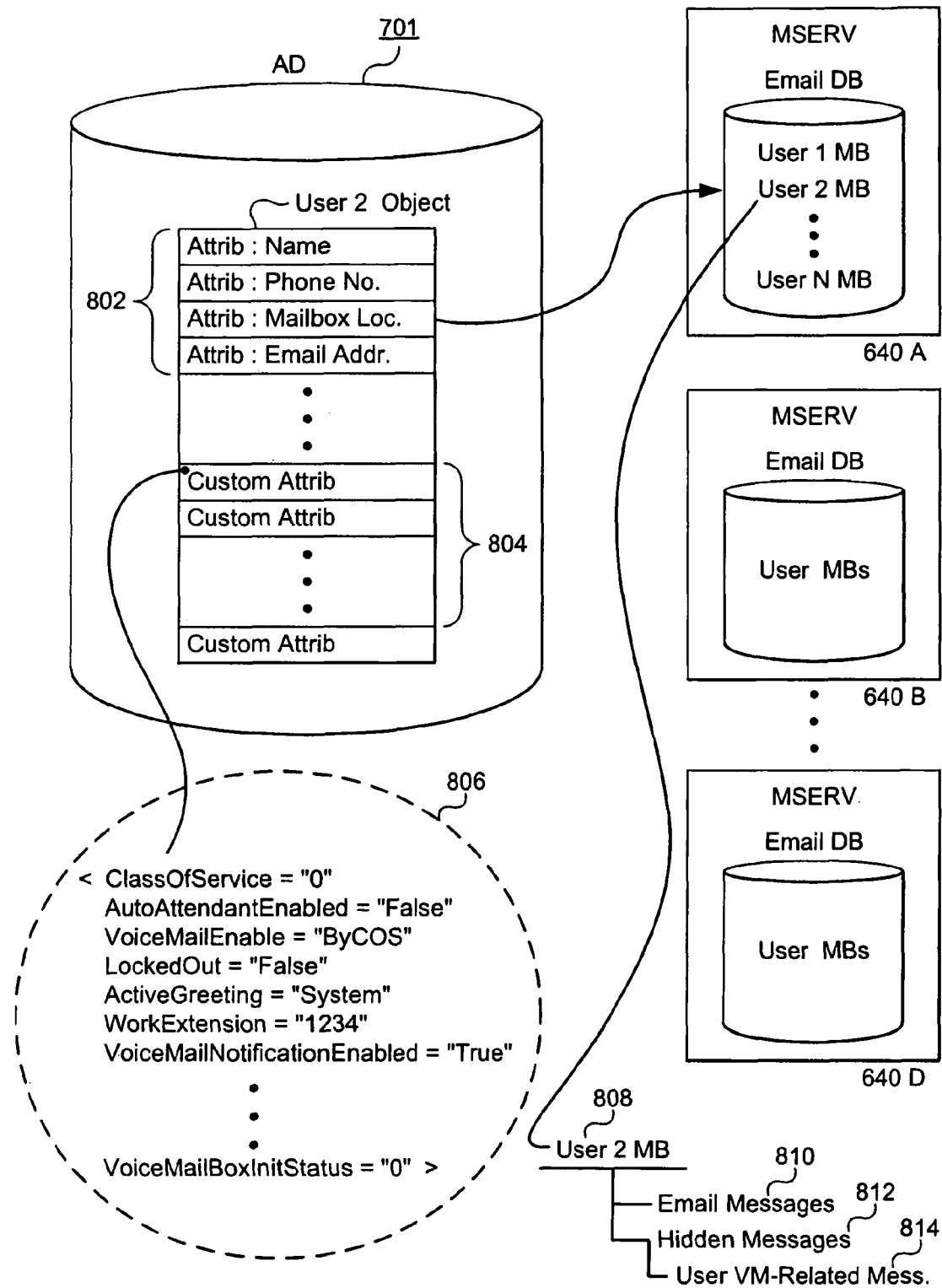
FIG. 8 is a block diagram of an embodiment in which data that is particular to users of MCS, MCS Voice Applications, and Mobile Applications is stored in AD and MSERVs.

FIG. 8 is a block diagram of an embodiment in which data that is particular to users of MCS 610, MCS Voice Applications, and Mobile Applications is stored in AD 701 and MSERVs 640. This facilitates integration of the users into an existing enterprise using a directory service such as AD, both in terms of integrating the user experience and integrating the administration experience, as will be further described below.

User 2 object is shown in FIG. 8. A user object in AD 701 includes many "fixed" attributes 802 for storing predefined information about User 2. There are hundreds of AD fixed attributes 802, such as name, phone number, mailbox location, email address, etc. However, multiple attributes of User 2 are specific to the Voice Applications of MCS 610, and are not provided for in AD, or other off-the-shelf directory services. For convenience of reference, these MCS 610 user attributes will be referred to as voice mail (VM) attributes. According to one embodiment, the VM attributes are stored in another portion of AD set aside for "custom attributes" 804. Currently fifteen (15) custom attributes are supplied with AD and each can be used to store up to 2048 bytes of data. In an embodiment, the VM attributes are collected in a string 806 and stored in one custom attribute. String 806 of VM attributes provides information specific to User 2's relationship to the Voice Applications and MCS 610. For example, VM attributes 806 include: ClassOfService (COS), which includes levels of telephone and VM service; whether an auto attendant is enabled for User 2's phone number; whether User 2 is locked out of the VM system; whether an active greeting is on; User 2's work phone extension; whether User 2's VM notification is enabled, etc. As discussed more fully below, each of the VM attributes is generated, and assembled in the string for storage in the custom attribute. Any of the available custom attributes may be used to store VM attributes 806.

Typically, the data included in VM attributes 806 is infrequently changed after a user is set up and enabled by a system administrator. However, VM attributes 806 are easily modified by regenerating them and storing a new VM attribute string 806 in one of custom attributes 804. An alternative method of storing the VM attributes is to extend the AD schema by populating unused fixed attributes. The fixed attributes accommodate significantly less data, so one VM attribute might be stored in one fixed attribute. Although this is an alternative to the scheme shown in FIG. 8, it is difficult or impossible to "undo" the AD schema extension once it is done, and this may be a factor in the choice of a scheme for storing the VM attributes. In addition, in enterprises that include more than one instance of AD, it is something of a challenge to keep all instances identical over time as data is updated in the extended attributes.

To further integrate the Voice Applications and other functionality of MCS 610 into the enterprise with MSERVs 640, data that is too large to store in the custom attributes (or in the fixed attributes) is stored in a database of MSERV 640. In one embodiment, each MSERV 640 includes an email database that stores user emails in designated locations. A user's email data store is sometimes referred to as a user mailbox or inbox. A user mailbox typically contains incoming email messages, sent email messages, archived email messages, etc. Retention policies for the user mailbox can be set by a combination of the user and the system administrator.

As shown in FIG. 8, there may be multiple MSERVs 640A-640D. The mailbox for User 2 can be on any of MSERVs 640. In this case, User 2's mailbox, mailbox (MB) 808, is stored on MSERV 640A. User 2 object on AD 701 includes a pointer to the location of MB 808 in the attribute "mailbox location." This directs any inquiries or actions related to MB 808 to the appropriate MSERV 640, database, and mailbox.

MB 808, as previously described, includes email messages 810. MB 808 further stores hidden messages 812. In an embodiment, the MSERV supports a "normal" type, including email messages 810, as well as a "hidden" message type. Hidden messages are not routinely accessible by the user through the normal user email interfaces. In an embodiment, a hidden message 812 is used to store data used by the Voice Applications, also referred to as VM-related information. In one embodiment, the VM-related information is stored as one or more attachments to a particular user VM-related hidden message 814. The attachments include audio files with various greetings, such as a "busy" greeting for the user's voice mail mailbox, and a "no answer" greeting for the user's voice mail mailbox.

Figure 9:
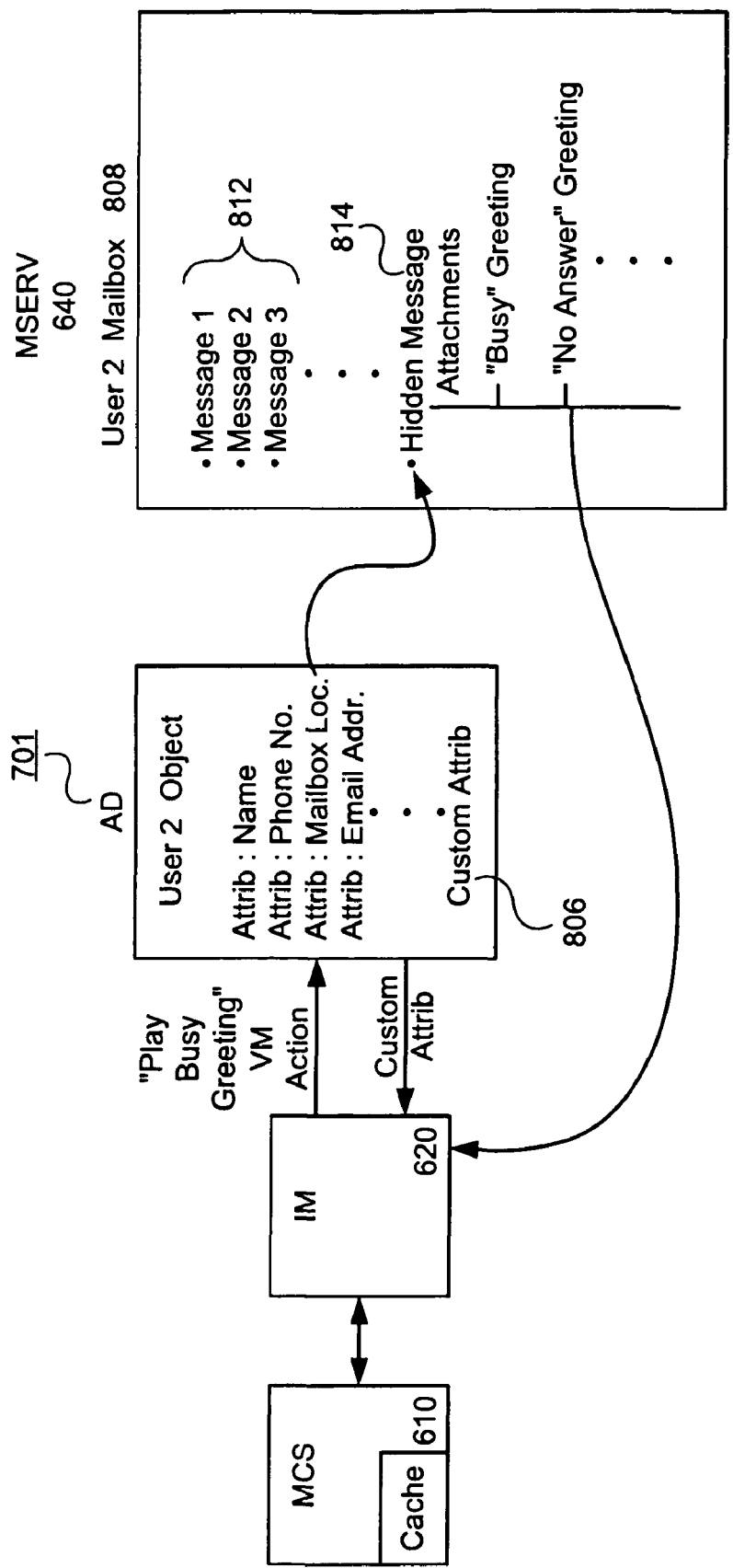
FIG. 9 is a block diagram of an example of the integration of MCS Voice Applications with enterprise MSERVs, under an embodiment.

An example of the integration of Voice Applications of MCS 610 with enterprise MSERVs 640 according to an embodiment is shown in the block diagram of FIG. 9. MCS 610 accesses MSERVs 640 through IM 620. One example of a voice application is a phone caller calling the voice mail mailbox of User 2 when User 2 is on the phone. MCS 610 transmits an action via IM 620 with a request to "play no answer greeting." The transmission includes information to access User 2 object fixed attributes 802 to determine User 2's email mailbox location. In addition, the transmission includes information to access User 2 object custom attribute 806 and to transfer the contents of the custom attribute to MCS 610 via IM 620. When User 2 email mailbox 808 is accessed, VM-related hidden message 814 is opened to transfer the appropriate audio file ("no answer" greeting in this case) to the MCS for playing over the phone to the caller.

In some cases, it may not be necessary to transfer either the custom attribute or the audio file(s) from MSERV 640 because the current custom attributes and audio files are stored on the MCS. In various embodiments, the custom attributes and hidden message data are cached on the MCS, as will be discussed in more detail below.

Operations of the Voice Applications and the Virtual Machine couple Cache and other components of the MCS to components of the MSERV via the IM as described herein. As such, the MCS and IM support the transfer of information between Cache and backend network components like the MSERV and the Database. This configuration provides transparency between the Voice Applications and data stored in the Database when using Database information to support voice mail messaging functions of the MCS, as described below.

Figure 10:
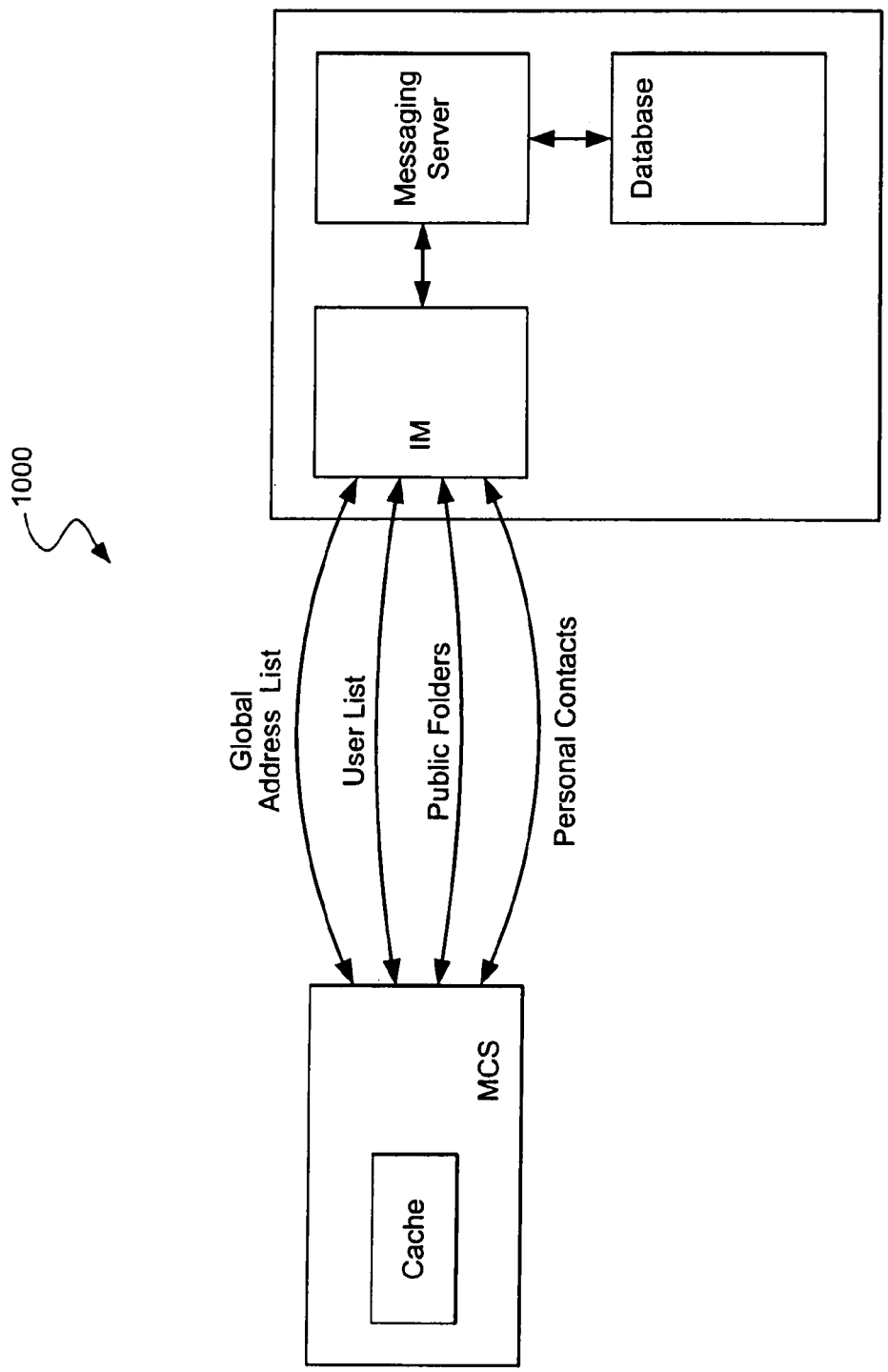
FIG. 10 is a block diagram of information transfers between the MCS and/or Cache and IM, under an embodiment.

FIG. 10 is a block diagram 1000 of information transfers between the MCS and/or Cache and IM, under an embodiment. The information transfers between Cache and the MSERV along with use of Custom Attributes and Hidden Messages as described above allow the ICS to overcome the need for an external database to store information stored by a typical voice mail system. This is because the information used by the MCS in providing voice mail message capabilities integrated with email messaging capabilities of the enterprise network is pushed from the MSERV to the MCS by the IM. The pushing may be performed periodically, continually, on demand, and/or in response to particular events (e.g., update of the information in the MSERV) but is not so limited. The information pushed to the MCS includes information of a "Global Address List" ("GAL"), information of a "User List," information of the "Public Folder," and information of "Personal Contacts." Information of the GAL, User List, Public Folder, and Personal Contacts may collectively be referred to herein as "user information," but user information is not necessarily limited to this information.

The GAL includes information of all users in the enterprise network having access privileges that include use of email. The GAL may be stored in the directory service (e.g., AD). The Public Folder includes information of the network enterprise (e.g., contacts, calendars, etc.) that is shared with all users. As an example, the Public Folder can include shared contacts and/or other information like calendars that are applicable to all members of the enterprise. The Personal Contacts include corresponding contact information for each user.

The User List includes user information for a subset of users in the GAL each of whom has access privileges that include use of the ICS. The User List therefore is a subset of the GAL and is pulled and/or cached as a separate list or stream in order to improve efficiency of communications and minimize delays associated with having the MCS search the entire contents of the GAL for information used in executing a user-requested action on a voice mail message. The User List of an embodiment includes one or more of the following parameters corresponding to each user (referred to as user information), but is not limited to these parameters: site identification, mail box number, pronounceable name, office telephone extension, COS, automatic attendant state (e.g., enabled, disabled), voice mail state (e.g., enabled, disabled), Voice User Interface ("VUI") state (e.g., enabled, disabled), mobile access state (e.g., enabled, disabled), bad logins, locked out, attendant destination, force change of PIN code, mobile gateway identification, full name, first name, last name, user name, home telephone number, office telephone number, cellular telephone number, identification, email address, department, active greeting state, time and date announcement, voice mail notification state (e.g., enabled, disabled), mail box status, PIN code, no answer greeting, busy greeting, extended absence greeting, recorded name, and system greeting.

Instead of storing information pushed from the MSERV in a separate voice mail database as would be done in a typical voice mail system, the information is pushed by the IM to the MCS and held in Cache. The MCS uses the cached information in subsequent voice mail message manipulation operations as described herein. This pushing and caching of information by the MCS improves speed and efficiency of voice mail message operations and prevents unnecessary loads on the MSERV resulting from the nearly continuous stream of read requests to the MSERV Database in typical messaging systems.

The pushing and caching of user information by the IM and/or MCS serves to reduce the impact that losses of data would have on the ICS in providing voice mail message functions. The typical voice mail system uses database storage that is separate and independent from the database of the email system. As such, periodic synchronization operations are needed to synchronize the voice mail system database with that of the email system. If the voice mail system database becomes corrupt for any reason or fails to receive updated information during a synchronization operation with the email system database, the result is that the voice mail database is left in an unknown state regarding the validity of the data. The pushing and caching provided by the ICS reduces if not eliminates this issue because any loss of data in the MCS is efficiently overcome by the periodic and/or on-demand pushing of the user information to the MCS.

The pushing of information from the MSERV by the IM includes pushing of information including the GAL, Public Folder, and User List. The pushed information is cached by the MCS on a system or non-individual basis because this information applies throughout the enterprise. This information is pushed by the IM and cached periodically, for example at 24-hour intervals (e.g., each morning at 2:00 am), but is not so limited.

In contrast the IM pushes and the MCS caches information of the Personal Contacts on a per-user basis because this information is different for each user. The Personal Contacts pushed by the IM and cached by the MCS periodically or on demand (e.g., at the time a user logs in to the ICS, in response to modifications of the Personal Contacts, etc.).

Cache of an embodiment may include local cache that is local to the MCS. Additionally, Cache may include a distributed cache system in which the user information is distributed among Caches of multiple MCSs. As an example, the configuration of an embodiment includes four (4) MCSs where each MCS includes components of and/or is coupled to a distributed cache system in a configuration that allows for caching of the same information on one or more of the MCSs in addition to caching information on a particular MCS and allowing other MCSs to access the cached information of the particular MCS.

The MCS may hold user information in the local cache and or distributed cache in any number of combinations. For example, the MCS may hold all user information in the local cache reserving the distributed cache for other information. Alternatively, the MCS may hold all user information in the distributed cache reserving the local cache for other information. Further, the MCS may hold the user information in both the local and distributed cache.

One scenario under which the MCS holds user information in both local and distributed cache systems is when all user information received from the IM is held in local cache while a subset of user information is held in distributed cache. This scenario may be used for example to store select user information in distributed cache, where the select user information includes information like user PIN codes and/or other parameters that may be changed by the user via the MCS. Under this scenario, the MCS pulls these user-modifiable parameters from received user information from the IM, and places these parameters in distributed cache; all other information received from the MCS is placed in local cache.

Figure 11:
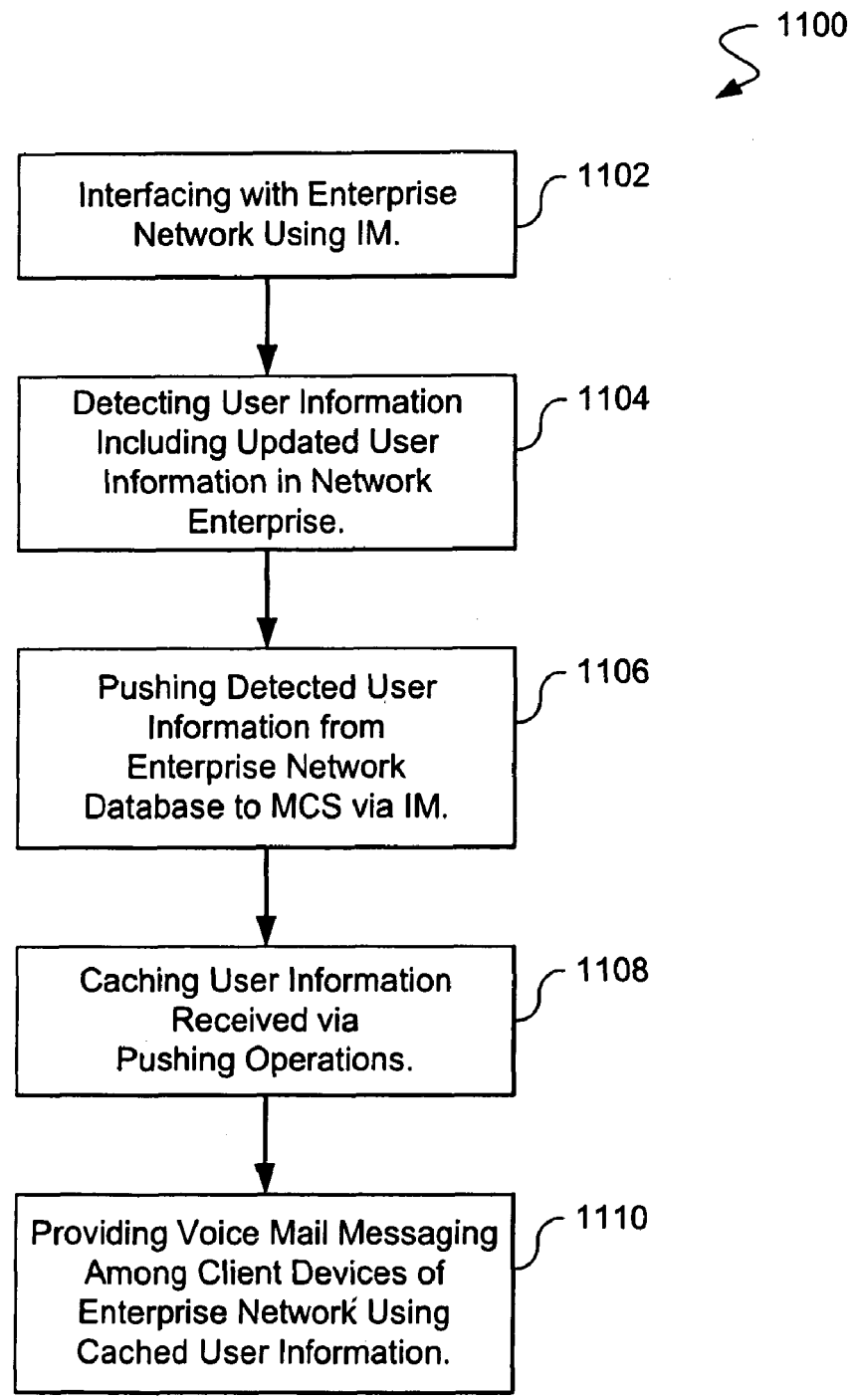
FIG. 11 is a flow diagram for providing user information to the MCS from a network enterprise database, under an embodiment.

FIG. 11 is a flow diagram for providing user information to the MCS from a network enterprise database, under an embodiment. The process includes interfacing with the enterprise network using the IM, at block 1102. As described above, the network enterprise includes a Database storing a groupware application and a directory service, and the directory service stores user information for use in email messaging among client devices coupled to the network.

The process continues by detecting and retrieving user information in the network enterprise, at block 1104. The detection and retrieval of user information includes detecting and retrieving user information that has been updated or modified. The process further includes pushing user information from the Database to the MCS, at block 1106. The pushing includes regular pushing at pre-specified intervals, on demand pushing performed in response to a request, and as needed pushing. The process also includes caching of user information received as a result of the pushing operations, at block 1108. The MCS and/or IM provide voice mail messaging among the client devices using cached user information, at block 110.

The ICS of an embodiment also includes processes for caching user information received via IM push operations, where caching includes updating of user information previously cached at the MCS/Cache. The updating of cached user information in an embodiment includes detecting updated information using the IM and pushing detected information to the MCS and/or Cache as appropriate to a network configuration. The detection of updated user information includes detecting modifications to user information performed by a network administrator (e.g., administrator changes a telephone extension for a voice mail system user), for example. Once detected, the IM of an embodiment may incrementally push updated user information to the MCS, as described above. The pushing includes pushing of all user information corresponding to a user for whom the administrator has changed any component of his/her user information. Alternative embodiments however may push only revised information or information of differences (e.g., delta files/streams or difference files/streams) resulting from updates.

The IM detects updates to user information made through a user interface of the ICS, but is not so limited. In an alternative embodiment, for example, the IM detects updates made by an administrator using an interface of the directory service or other email system interface (e.g., AD interface).

Updates to user information may include any number of changes to user information. Examples of updates therefore include updating user information, enabling new users, and disabling existing users to name a few. Descriptions follow of operations for updating user information. While updates of user information are described below in the context of specific types of user information (e.g., Personal Contacts), the embodiment is not so limited. Alternative embodiments may update various other collections or sets of user information (e.g., Global Address List) using processes similar to those described herein.

One example of the IM pushing updated user information to components of the ICS (e.g., MCS) occurs when the network administrator updates user information corresponding to an existing user. The IM detects the updates to user information and pushes the user information including the updated information to the MCS. The IM may push updated user information of a single user in one push transaction and/or one data stream. Alternatively, the IM may push updated user information of any number of multiple users in one push transaction and/or one data stream.

The MCS, when receiving updated user information, identifies a user to whom the user information corresponds. The MCS also uses an entry identification assigned to user information by the MSERV to relate received user information to user information currently held in Cache. When the MCS determines that user information in Cache corresponds to received user information, the MCS updates user information held in Cache using received user information. The MCS adds received user information to Cache when the MCS fails to identify user information corresponding to received user information in Cache.

Another example of the IM pushing updates of user information to components of the ICS (e.g., MCS) occurs when the network administrator adds user information corresponding to a new user. The IM detects new user information and pushes the new user information to the MCS. The IM may push new user information of a single new user in one push transaction. Further, the IM may push new user information of any number of new users in one push transaction.

The MCS, when receiving new user information, uses the entry identification assigned by the MSERV to attempt to relate the new user information to user information currently held in the cache as described above. The MCS will be unable to identify cached user information corresponding to the updated user information because the received user information is new user information (for a new user). Consequently, the MCS adds the new user information to the Cache.

Figure 12:
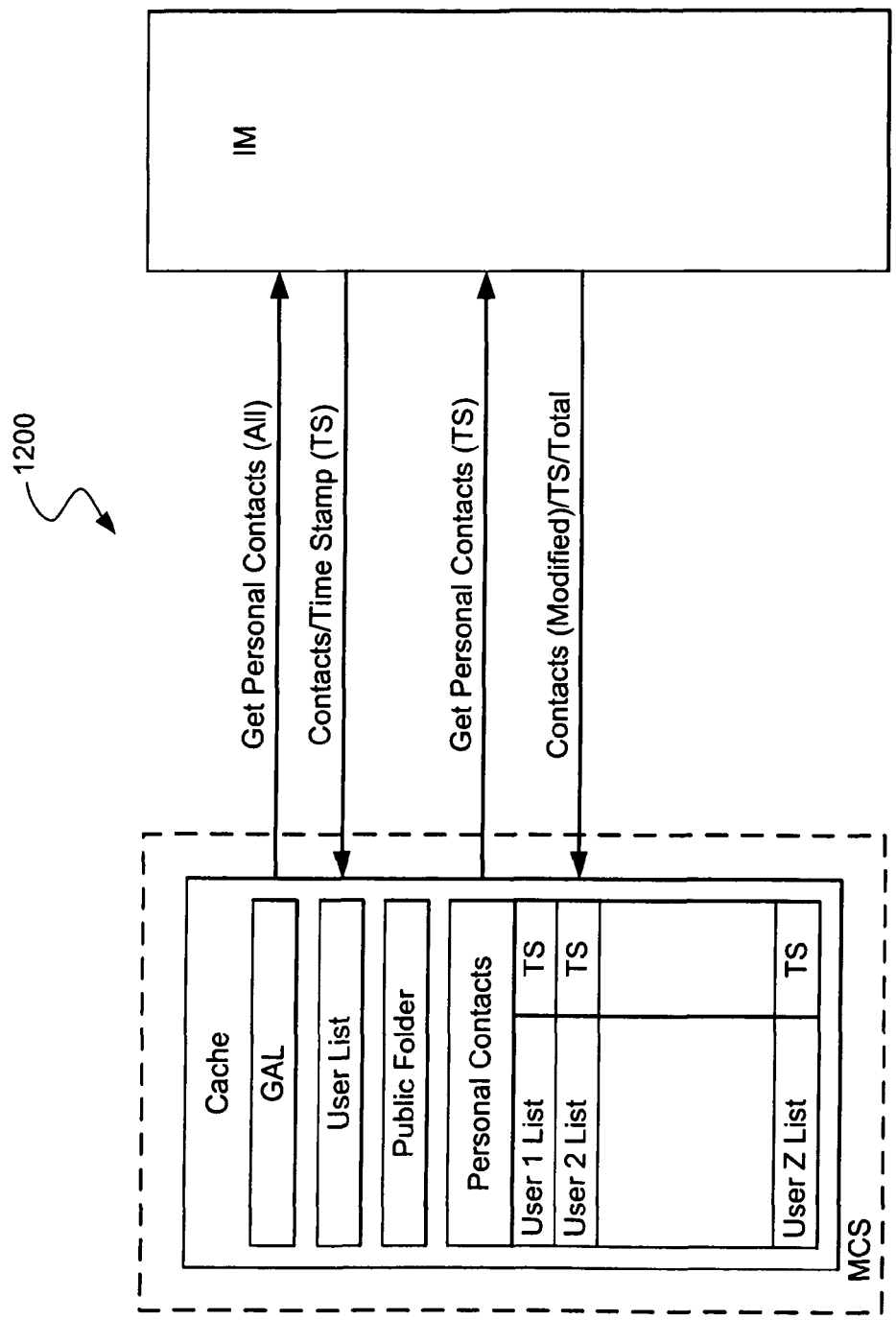
FIG. 12 is an information flow diagram for incremental loading of user information, under an embodiment.

The user information may be pushed by the IM and cached by the MCS periodically and/or on an "as needed" basis (e.g., at the time a user logs in to the ICS, in response to modifications of the Personal Contacts, etc.) as described above. Upon receipt of user information, the MCS of an embodiment incrementally loads the user information for holding in the Cache. FIG. 12 is an information flow diagram 1200 for incremental loading of user information, under an embodiment. The incremental loading example of this flow diagram 1200 assumes loading of Personal Contacts but may be used for any type of user information and/or other information of the enterprise network Database.

This example begins with a user's first time login to an MCS of the enterprise network. The MCS in response to initiation of the first user login event detects no cached Personal Contacts corresponding to the user, and generates a request ("GetPersonalContactsAll") for all Personal Contacts of the user. The MCS transfers the request to the directory service Database via the IM. The IM retrieves the Personal Contacts from the Database in response to the request and pushes the Personal Contacts to the MCS along with a time stamp "TS." The MCS caches information of the Personal Contacts in an area of Cache corresponding to a user (e.g., "User Z List") along with the time stamp information (e.g., "TS").

The example continues when the user subsequently logs in to the MCS. The MCS in response to initiation of the subsequent user login detects cached Personal Contacts corresponding to the user, and generates a request ("GetPersonalContactsTS") for all Personal Contacts of the user modified since the date/time specified by the cached time stamp information. In contrast to a first login event, this request includes the time stamp information corresponding to the cached Personal Contacts.

The MCS transfers the request to the directory service Database via the IM. The IM retrieves and pushes updated Personal Contacts modified since the date/time specified in the time stamp information of the request, along with an updated time stamp. Additionally, the IM includes in the pushed information a total number ("Total") of the user's Personal Contacts found in the Database. The MCS merges the updated Personal Contacts with the cached Personal Contacts and Caches the updated time stamp. The updated Personal contacts include but are not limited to modified contacts, new contacts, and deleted contacts.

In responding to a request for Personal Contacts, the ICS uses the time stamp information to ensure that unsynchronized clocks between the MCS and the database system for example do not result in the exclusion of some Personal Contacts from subsequent Personal Contact update operations. In so doing the IM generates the time stamp at such time as the IM receives the request from the MCS for Personal Contacts. The IM generates the time stamp by reading the server time of the MSERV before Personal Contacts are accessed (e.g., at the time the IM begins to generate the Personal Contact stream).

In contrast, if the IM were to generate the time stamp at the time the Personal Contacts were pushed to the MCS, a scenario might arise in which the contacts are updated after retrieval of the Personal Contacts by the IM but before push of the Personal Contacts to the MCS and generation of the time stamp. Thus, generation of the time stamp before accessing the Personal Contacts prevents the scenario in which an update by the user in the interim period between retrieving an update request and time stamping the Personal Contacts results in updated Personal Contacts being missed by the IM and thus not cached in the MCS.

In addition to the time stamp, the IM includes in a response the total number of the user's Personal Contacts identified in the database as appropriate to the request. The MCS uses the total number of Personal Contacts in one or more types of incremental loading scenarios as described below.

One example showing use of the total number of Personal Contact is an incremental loading scenario in which a new contact has been added to the Personal Contacts. To begin, User Z's Personal Contact list includes three (3) contacts. User Z logs in to the ICS for the first time, and the MCS detects no cached Personal Contacts corresponding to User Z. The MCS requests (GetPersonalContactsAll) all Personal Contacts for User Z from the IM. In response to the request, the IM generates a time stamp (TS=0900), retrieves the three Personal Contacts, generates a data stream including the Personal Contacts and the time stamp, and pushes the data stream to the MCS. Upon receiving the data stream the MCS caches the three Personal Contacts and the time stamp information (TS=0900).

A new Personal Contact is subsequently added to User Z's Personal Contacts at 0930 hours. User Z again logs in to the ICS at a later time (1000 hours), and the MCS finds three cached Personal Contacts corresponding to User Z. The MCS requests updated Personal Contacts (GetPersonalContactsTS) for User Z from the IM, where the time stamp indicates the time (TS=0900) corresponding to the currently cached Personal Contacts. In response to the request, the IM generates a time stamp (TS=1000), determines a total number of contacts (Total=4), retrieves the new Personal Contact added since the time stamp of the request (0900), and generates a data stream including the new Personal Contact, the time stamp, and the total number of contacts. The IM pushes the data stream to the requesting MCS. Upon receiving the data stream the MCS reads the cache and determines the new contact of the data stream is not present in cached Personal Contacts. In response, the MCS updates the cache to include the new Personal Contact, and updates the cached time stamp (TS=1000).

Another example showing use of the total number of Personal Contact is a scenario in which information of a contact has been modified. To begin, User Z's Personal Contact list includes three (3) contacts. User Z logs in to the ICS for the first time, and the MCS finds no cached Personal Contacts corresponding to User Z. The MCS requests (GetPersonalContactsAll) all Personal Contacts for User Z from the IM. In response to the request, the IM generates a time stamp (TS=0900), retrieves the three Personal Contacts, generates a data stream including the Personal Contacts and the time stamp, and pushes the data stream to the MCS. Upon receiving the data stream the MCS caches the three Personal Contacts and the time stamp information.

A Personal Contact (contact #2) is subsequently updated in User Z's Personal Contacts at 1100 hours. User Z again logs in to the ICS at a later time (1230 hours), and the MCS finds three cached Personal Contacts corresponding to User Z. The MCS requests updated Personal Contacts (GetPersonalContactsTS) for User Z from the IM, where the time stamp indicates the time (TS=0900) corresponding to the currently cached Personal Contacts. In response to the request, the IM generates a time stamp (TS=1230), determines a total number of contacts (Total=3), retrieves the Personal Contact updated since the time stamp of the request (0900), and generates a data stream including the updated Personal Contact (contact #2), the time stamp (TS=1230), and the total number of contacts (Total=3). The IM pushes the data stream to the requesting MCS. Upon receiving the data stream the MCS reads the cache and determines a Personal Contact has been updated, updates the cache to include the updated Personal Contact (contact #2), and updates the cached time stamp (TS=1230).

An additional example shows use of the total number of Personal Contact in a scenario in which a contact has been deleted. To begin, User Z's Personal Contact list includes three (3) contacts. User Z logs in to the ICS for the first time, and the MCS finds no cached Personal Contacts corresponding to User Z. The MCS requests (GetPersonalContactsAll) all Personal Contacts for User Z from the IM. In response to the request, the IM generates a time stamp (TS=0900), retrieves the three Personal Contacts, generates a data stream including the Personal Contacts and the time stamp, and pushes the data stream to the MCS. Upon receiving the data stream the MCS caches the three Personal Contacts and the time stamp information.

A Personal Contact (contact #3) is subsequently deleted from User Z's Personal Contacts at 1000 hours. User Z again logs in to the ICS at a later time (1100 hours), and the MCS finds three cached Personal Contacts corresponding to User Z. The MCS requests updated Personal Contacts (GetPersonalContactsTS) for User Z from the IM, where the time stamp indicates the time (TS=0900) corresponding to the currently cached Personal Contacts. In response to the request, the IM generates a time stamp (TS=1100) and determines a total number of contacts (Total=2). The IM determines no contacts have been modified in the database since the time stamp of the request (0900) and in response generates a data stream including the TS and the total number of contacts (two). The IM pushes the data stream to the requesting MCS. Upon receiving the data stream the MCS reads the cache and determines a Personal Contact has been deleted by comparing the total number (two) of contacts received from the IM with the number of contacts (three) currently in the cache.

The MCS requests (GetPersonalContactsAll) all Personal Contacts for User Z from the IM in response to determining a contact has been deleted. In response to the request, the IM generates a time stamp (TS=1100), retrieves the two Personal Contacts, generates a data stream including the Personal Contacts and the time stamp, and pushes the data stream to the MCS. Upon receiving the data stream the MCS caches the two Personal Contacts.

Yet another example shows use of the total number of Personal Contact in a scenario in which no contacts have been added, deleted, or modified. To begin, User Z's Personal Contact list includes three (3) contacts. User Z logs in to the ICS for the first time, and the MCS finds no cached Personal Contacts corresponding to User Z. The MCS requests (GetPersonalContactsAll) all Personal Contacts for User Z from the IM. In response to the request, the IM generates a time stamp (TS=0900), retrieves the three Personal Contacts, generates a data stream including the Personal Contacts and the time stamp, and pushes the data stream to the MCS. Upon receiving the data stream the MCS caches the three Personal Contacts and the time stamp information.

User Z again logs in to the ICS at a later time (1000 hours), and the MCS finds three cached Personal Contacts corresponding to User Z. The MCS requests updated Personal Contacts (GetPersonalContactsTS) for User Z from the IM, where the time stamp indicates the time (TS=0900) corresponding to the currently cached Personal Contacts. In response to the request, the IM generates a time stamp (TS=1000) and determines a total number of contacts (Total=3). The IM determines no contacts have been modified in the database since the time stamp of the request (0900) and in response generates a data stream including the TS and the total number of contacts (three). The IM pushes the data stream to the requesting MCS. Upon receiving the data stream the MCS reads the cache, determines from absence of contact information that no contacts have been modified, and determines by comparing the total number (three) of contacts received from the IM with the number of contacts (three) currently in the cache that no contacts have been added or deleted. The MCS updates time stamp information of the cache (TS=1000) using the received time stamp.

In operating to provide integrated messaging capabilities, the MCS and the IM function to route a call placed by a caller to a user and, in the event the user is not available, to receive and route a voice mail message left by the caller. The MCS and the IM also function to provide a user with access to voice mail messages using the messaging server of the enterprise email system. The voice mail access supports both online and offline modes of the messaging server.

An example of call routing by the MCS, and with further reference to FIG. 6, the MCS receives and detects a call at the Telephony Interface. Data of the call (e.g., called party information, calling party information, reason for call transfer, etc.) invokes the Voice Browser. The Voice Browser transfers a request to the Voice Applications in response to the call data.

A Dispatcher component of the Voice Applications routes the call to one or more other Voice Application components in accordance with information of the User List. As an example, the Dispatcher identifies the target user for the call, and determines whether the target user's automatic attendant is enabled. If the automatic attendant is enabled then the automatic attendant receives the call request and provides the caller with one or more call routing options (e.g., caller selects call routing by selecting and/or saying extension number, selecting and/or saying name, etc.) and routes the call according to the caller's input.

As an example, one or more of the Voice Applications determine an active greeting currently designated by the user for use in responding to calls (e.g., system greeting, no answer greeting, busy greeting, extended absence greeting, etc.), and retrieve the designated active greeting from one of the Cache or MSERV as appropriate to a state of the MSERV. The respective application(s) play the greeting, activate a "record mode" to record the voice mail message of the caller, and provide the caller with additional options available for call and/or message routing (e.g., message marking options, message delivery options, send message, route message to additional users, etc.). Upon completion of the recording and/or selection of a message routing option by the caller, the respective application(s) terminate the call (hangs up) and transfer the recorded voice mail message to one or more locations in the Cache and/or MSERV (e.g., a mail box) that correspond to the user, as described below with reference to FIGS. 13, 14, and 15. Alternatively, the voice mail message may be transferred before the application terminates the call.

As referenced above, the MCS of an embodiment in conjunction with the IM supports availability of and access to the voice mail applications when the MSERV is both "online" and "offline" through the use of the Cache. The MCS of an embodiment includes an "Offline Detector" that monitors an availability state of the MSERV and detects unavailability ("offline condition" or "offline state") of the MSERV. Upon detecting MSERV unavailability, the MCS transitions to a mode that supports voice mail message recording and retrieval during the MSERV offline condition.

Caching of select information received and/or generated in the MCS, including User Information and voice mail information, enhances performance of the enterprise network voice messaging system by reducing the instances of data retrieval from the MSERV. Further, caching of select information improves the reliability of the enterprise network voice messaging system by allowing access to the voice messaging system during periods when the MSERV is offline.

Information received at the MCS is routed and held in the Cache in accordance with policies running in the state machine framework and/or the availability state of the MSERV. Examples of information held in the Cache include but are not limited to the User List, Global Address List, information of Public Folders, information of Personal Contact Folders, voice mail message information (both the text description portion and the audio message portion of the voice mail message), greetings, and other user parameters/permissions, and personal information of users (e.g., PIN codes).

Regarding actions taken by the MCS following receiving and recording of a voice mail message when the MSERV is online, the MCS generally holds information of the recorded message in the Cache. The MCS may also transfer the recorded voice mail message via the IM to the MSERV where it is stored in the Database.

Figure 13:
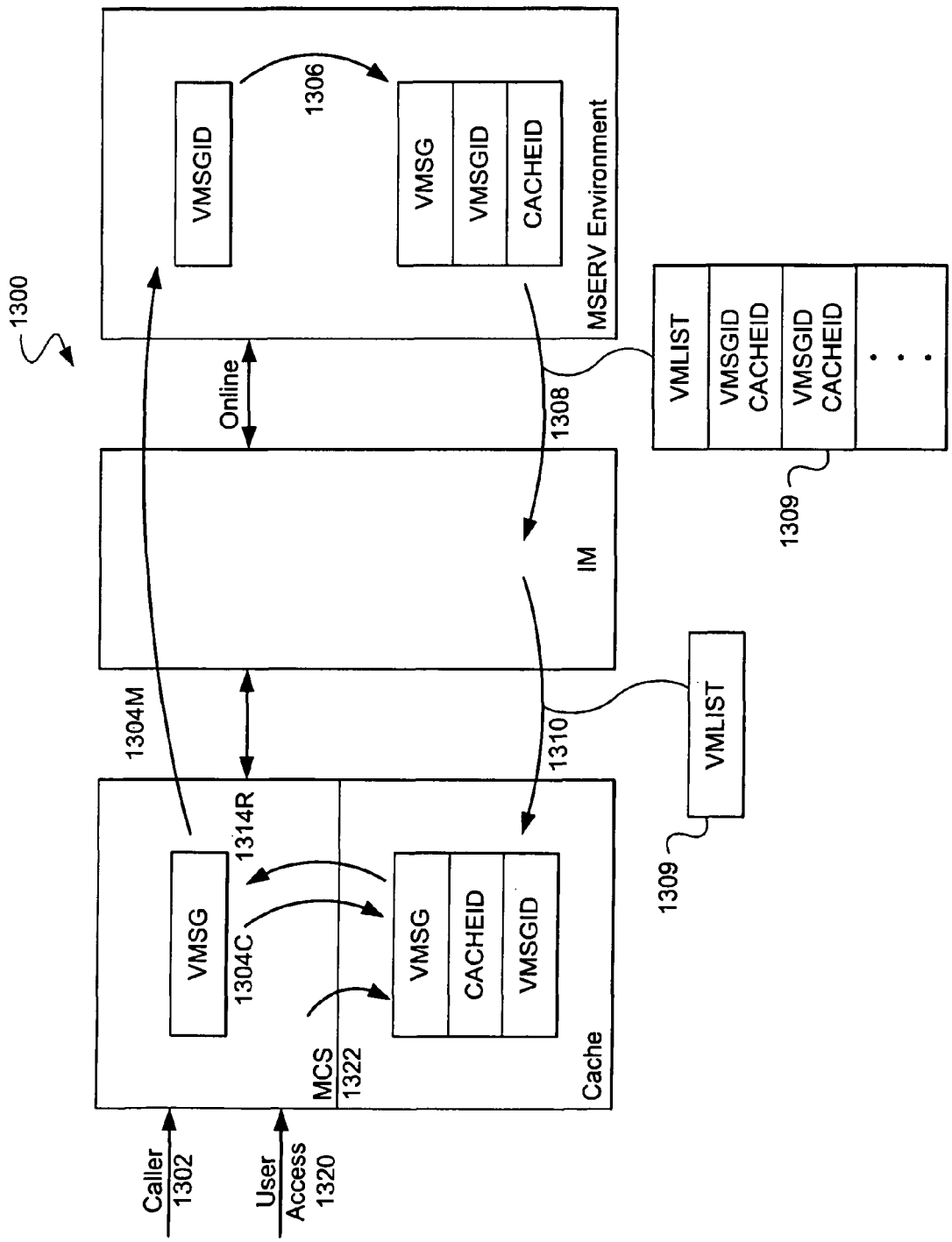
FIG. 13 is an information flow for routing and accessing voice mail messages via the ICS when the MSERV is in an online state, under an embodiment.

As an example, FIG. 13 is an information flow 1300 for routing and accessing voice mail messages via the ICS when the MSERV is in an online state, under an embodiment. This information flow 1300 shows one MCS and one MSERV in an enterprise network environment, but this is shown only as an example and does not limit the network environment to the types, numbers, and/or coupling of components shown as alternative embodiments may have any number of MCSs and/or MSERVs.

Information flow 1300 begins when a caller places a call 1302 to a user and availability of the user results in the caller leaving a voice mail message (referred to herein as the "VMSG") for the user. The voice mail message VMSG is received at the MCS and routed 1304C to the Cache where it is assigned an identification (referred to herein as the "CACHEID") and held. The voice mail message VMSG may be held in the Cache for a pre-specified period of time, but the embodiment is not so limited. The voice mail message VMSG and the CACHEID are also routed 1304M to the MSERV via the IM, as described above. The MSERV assigns an identification (referred to herein as the "VMSGID") to the incoming voice mail message VMSG and stores 1306 the voice mail message VMSG along with the VMSGID and CACHEID in one or more areas of memory (not shown) available to the MSERV. Memory may include any various form of storage or computer-readable memories such as, but not limited to, volatile memory (random access memory ("RAM"), non-volatile memory (read-only memory ("ROM"), EEPROM, disk, and/or other storage devices that may include one or more of magnetic and optical storage media.

As described above, the MCS pulls information (e.g., periodically, on demand, etc.) from the MSERV via the IM and uses the pulled information in providing voice mail message capabilities integrated with email messaging capabilities of the enterprise network. Therefore, pulling operations by the IM include pulling of information identifying the stored voice mail message VMSG, where the information identifying the voice mail message VMSG includes but is not limited to the CACHEID. Upon request from the MCS, the IM may pull 1308 a voice mail list (referred to herein as a "VMLIST" 1309), which includes CACHEIDs and VMSGIDs for any stored messages from the MSERV environment. The IM pushes 1310 VMLIST 1309 to the MCS where it is held. VMLIST 1309 may be generated from the user's inbox upon each request from the IM or may be stored and maintained in the MSERV or in the cache as a current representation of the contents of a user's voice mailbox, or inbox. If and when a time period for holding a VMSG in the Cache expires, the VMSG is still identifiable from VMLIST 1309, and can be found in the MSERV if requested, using the VMSGID.

Information flow 1300 continues when a user accesses 1320 the enterprise network system to retrieve his/her voice mail messages. In an embodiment, the user access 1320 causes the VMLIST to be pulled 1308 from the MSERV and pushed 1310 by the IM to the Cache, and also or alternatively to the MCS Upon being provided with access to the MCS, the user selects one or many voice mail message(s) by selecting a VMSGID/CACHEID item from the VMLIST. In response to the user selection, MCS searches 1322 the Cache for a message, using the Cache identification CACHEID of the selected message. In a scenario in which the message was left by the caller and the time period for holding the message VMSG in the Cache has not expired, the MCS will locate the CACHEID and the message contents VMSG in the Cache. Once located through use of the CACHEID, the MCS retrieves 1314R the voice mail message contents VMSG from the Cache, and plays the voice mail message for the user as appropriate to the action selected by the user.

In this manner the MCS provides user access to the contents of the voice mail message VMSG via a mapping and without storing voice mail message contents in the MCS. The mapping includes a mapping of voice mail message contents to identification information of the email environment (MSERV environment), and mapping identification information of the email environment to identification information of the voice mail environment (MCS). In this embodiment, therefore, the mapping includes mapping of voice mail message contents to the message identification VMSGID, and mapping of the message identification VMSGID of the email environment to the MCS identification CACHEID.

As used herein "pushing" data or information indicates an action of a component or entity that has the affect of transferring the data or information to another component or entity. Transferring includes sending in response to a request, query or command, and sending on the initiative of the transferring component or entity. The transfer may be an internetwork transfer, an intranetwork transfer, or a transfer between a network component or entity and a non-network component or entity.

As used herein "pulling" data or information indicates a component or entity receiving transferred data or information. Receiving includes receiving in response to a request, query or command, and retrieving in response to a request, query or command. The transfer may be an inter-network transfer, an intra-network transfer, or a transfer between a network component or entity and a non-network component or entity.

Figure 14:
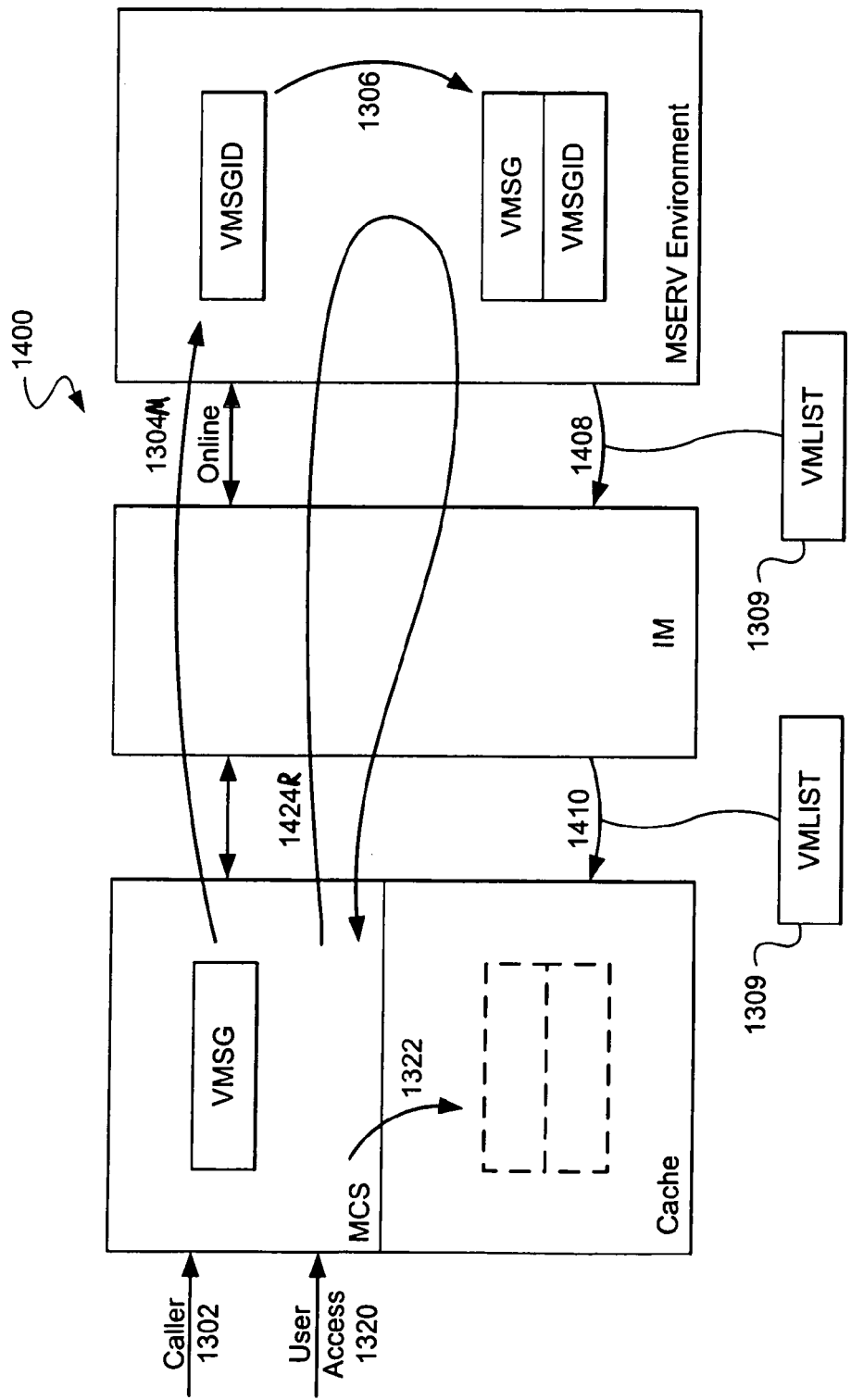
FIG. 14 is an alternative information flow for routing and accessing voice mail messages via the ICS when the MSERV is in an online state, under an embodiment.

FIG. 14 is an alternative information flow 1400 for routing and accessing voice mail messages via the ICS when the MSERV is in an online state, under an embodiment. This alternative information flow 1400 describes the scenario in which the message VMSG is left by the caller and stored in the cache and in the MSERV environment, and after expiration of the time for holding the message VMSG in the cache.

Information flow 1400 begins when a caller places a call 1302 to a user and availability of the user results in the caller leaving a voice mail message VMSG for the user. The voice mail message VMSG is received at the MCS and routed 1304C to the cache as described above, and the VMSG and CACHEID is routed 1304 to the MSERV via the IM, also as described above. The MSERV assigns identification VMSGID to the incoming voice mail message VMSG and stores 1306 the voice mail message VMSG along with the VMSGID in one or more areas of memory (not shown) available to the MSERV.

Information flow 900 continues when a user accesses 1320 the enterprise network system to retrieve his/her voice mail messages. VMLIST 1309 is pulled 1308 from the MSERV and pushed 1310 by the IM to the MCS. Upon being provided with access to the MCS, the user selects a voice mail message from VMLIST 1309, by selecting a CACHEID/VMSGID item. The MCS searches 1322 the Cache for the Cache identification CACHEID of the selected message in response to the user selection. Because the message was left by the caller and stored in the MSERV environment and expired in the cache before the user calls in, the MCS will not locate the CACHEID in the Cache. Consequently, the MCS accesses the MSERV, identifies the message VMSG, and pulls 1424 the voice mail message contents from the MSERV environment via the IM. The MCS plays the pulled voice mail message VMSG for the user as appropriate to the action selected by the user.

In addition to the online scenarios described above, the MCS of an embodiment provides offline behavior that allows for holding, storing, and retrieving voice mail messages when the MSERV is offline or unavailable for some reason, or during times when the connection between the MCS and the MSERV is unreliable. Offline behavior means absence of a coupling between the MSERV and the MCS. Regarding actions taken by the MCS following recording of a voice mail message when the MSERV is offline, a component of the MCS (e.g., Offline Detector) detects the MSERV is offline. The MCS holds the recorded voice mail message in the in response to detecting the MSERV state as offline. At such time as the MCS detects the MSERV is online, the Groupware Connector pulls the voice mail message from the Cache and transfers the recorded voice mail message via the IM to the MSERV where it is stored in the Database.

Figure 15:
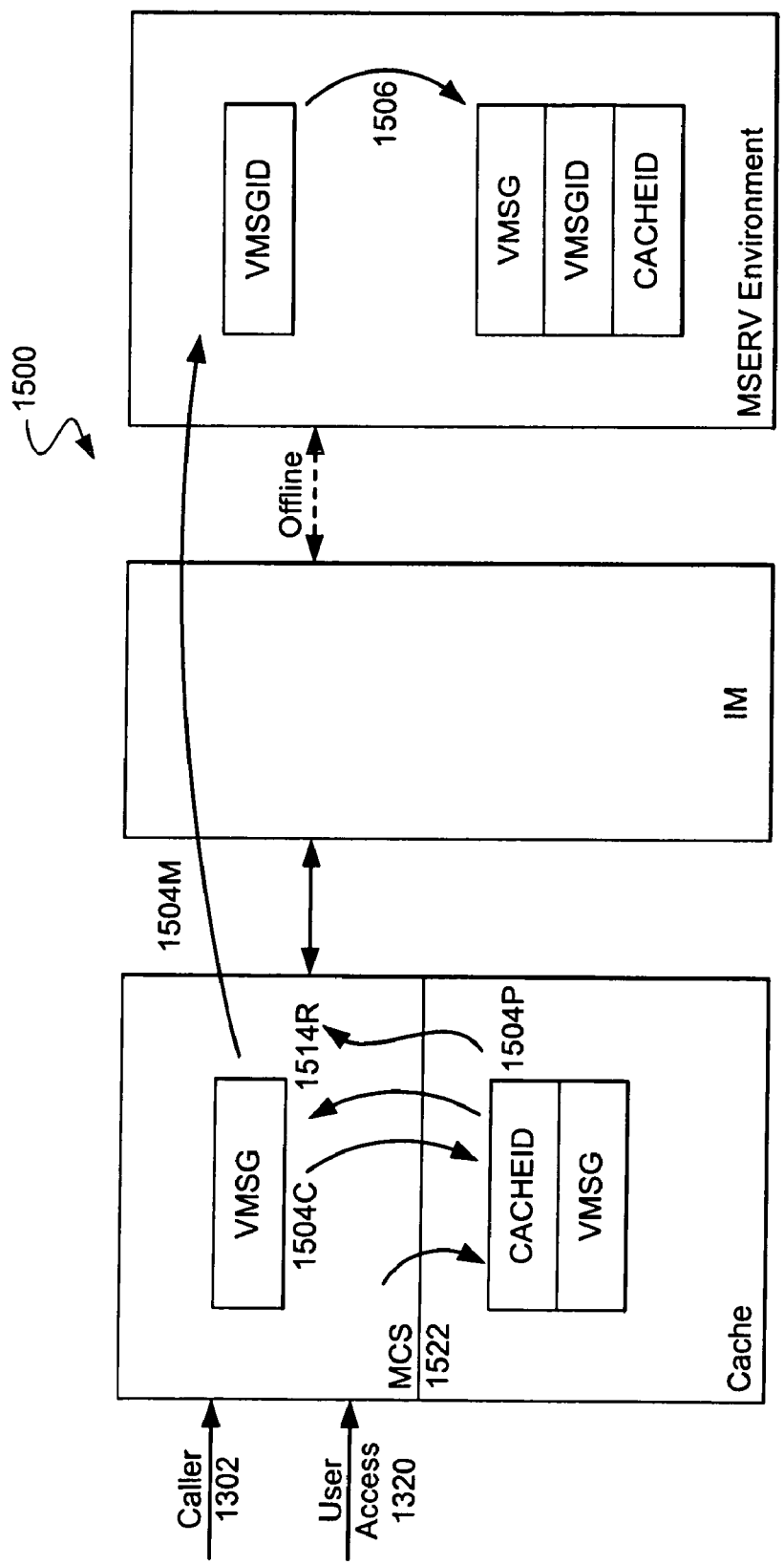
FIG. 15 is an information flow for routing and accessing voice mail messages via the ICS when the MSERV is in an offline state, under an embodiment.

As an example, FIG. 15 is an information flow 1500 for routing and accessing voice mail messages via the ICS when the MSERV is in an offline state, under an embodiment. This information flow 1500 shows one MCS and one MSERV in an enterprise network environment, but this is shown only as an example and does not limit the network environment to these components as alternative embodiments may have any number of MCSs and/or MSERVs.

The information flow 1500 begins when a caller places a call 1302 to a user and availability of the user results in the caller leaving a voice mail message VMSG for the user. The voice mail message VMSG is received at the MCS, however a component of the MCS detects an unavailable or offline condition of the MSERV. In response to detecting the offline condition, the MCS assigns a CACHEID to the incoming message VMSG, and holds 1504C the message contents VMSG along with the CACHEID in the Cache.

Information flow 1500 continues when a user accesses 1320 the enterprise network system to retrieve his/her voice mail messages while the MSERV remains in an offline condition. Upon being provided with access to the MCS, the user selects a voice mail message from a list of CACHEIDs generated from the collection of voice mail messages held for him/her in the cache. In response to the user selection, the MCS searches 1522 the Cache using the Cache identification CACHEID of the selected message. Upon locating the voice mail message by its CACHEID in the Cache, the MCS pulls 1514R the voice mail message contents from the Cache, and plays the voice mail message for the user as appropriate to the action selected by the user.

The MCS continues to monitor the condition of the MSERV. At such time as the MCS detects a return of the MSERV to an online condition, the MCS pulls 1504P the voice mail message VMSG and its CACHEID from the Cache, and transfers 1504M the voice mail message and CACHEID via the IM to the MSERV. The MSERV assigns an identification VMSGID to the incoming voice mail message VMSG and stores 1506 the voice mail message VMSG along with the VMSGID and CACHEID in one or more areas of memory as described above.

In addition to the capabilities described above, the ICS of an embodiment provides a Form-Based User Interface ("FBUI"). The FBUI is a form-based messaging or communication interface for use by users in retrieving voice mail messages and controlling actions taken on voice mail messages received in the enterprise network system. This FBUI enables a user to retrieve and take various actions on voice mail messages using data of a form (referred to herein as the "FBUI FORM") that is presented to the user's client device by the enterprise network email system. Use of the FBUI Form thus provides the user with access to the integrated messaging functions offered by the ICS without a requirement to install or run a dedicated client application on the user's client device.

Figure 16:
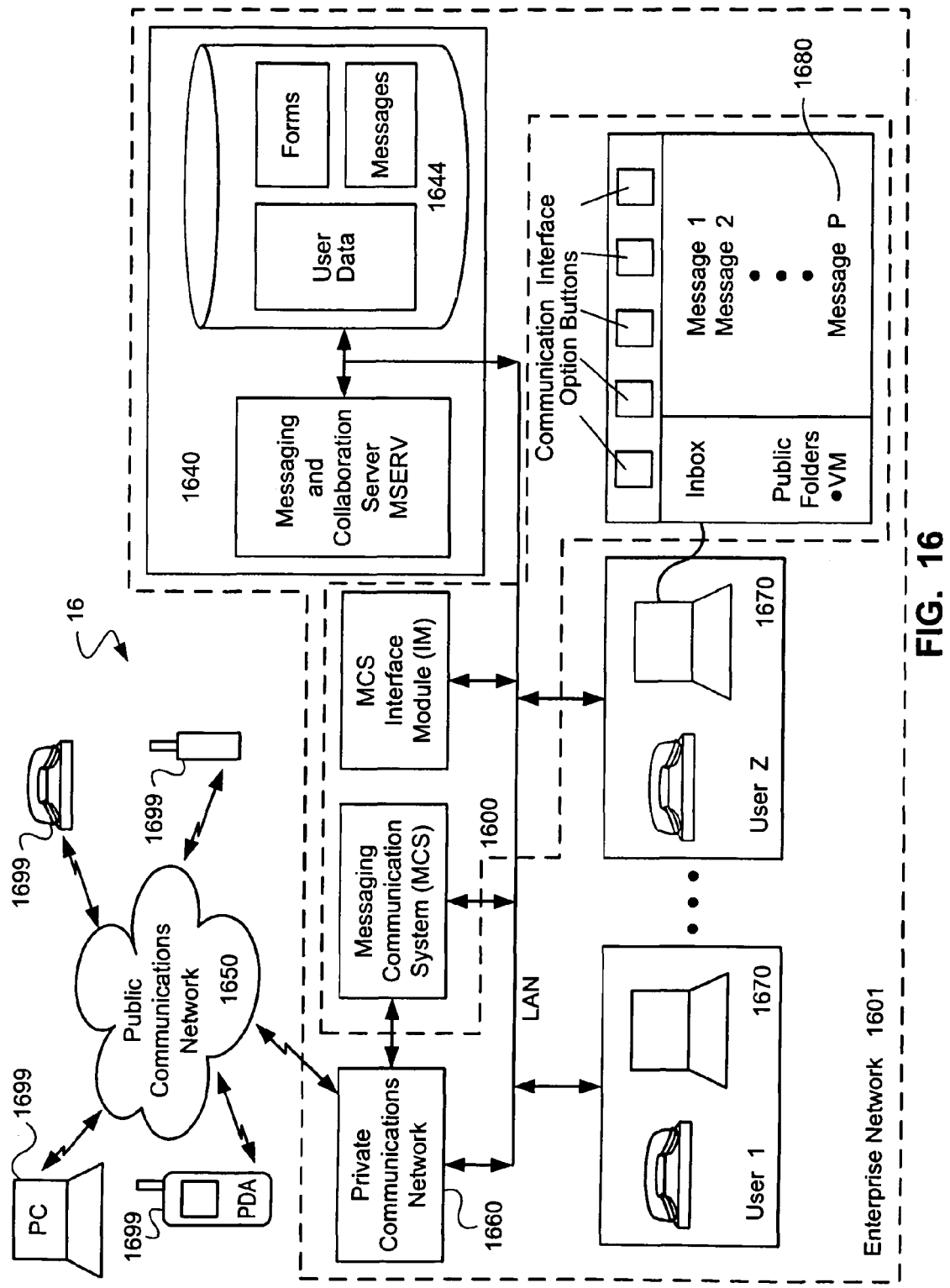
FIG. 16 is a block diagram of a system that includes the ICS with a Form-Based User Interface ("FBUI"), under an embodiment.

FIG. 16 is a block diagram of a system 16 that includes ICS 1600 with FBUI 1680, under an embodiment. System 16 includes an enterprise network 1601 that provides integrated voice mail and email messaging through the use of ICS 1600. Enterprise network 1601 includes a LAN that couples to components of ICS 1600 and a messaging server environment 1640. ICS 1600 includes MCS 1610, IM 1620, and FBUI 1680, but is not so limited. FBUI 1680 is presented to a user (e.g., USER Z) via one or more local devices like PCs or other processor-based devices.

Messaging server environment 1640 includes the MSERV and a Database 1644, but is not so limited. The LAN couples to any number of other networks 1650 and 1660 using any of a variety of communication protocols, where the networks 1650 and 1660 may be of the same or of different types. As an example, the networks may include a public communications network 1650 and a private communications network 1660. Private communications network 1660 may be a PBX coupled to the LAN of the enterprise network, for example. Networks 1650 and 1660 allow for information transfers between client devices 1670 that are local to enterprise network 1601 and client devices 1699 that are external to enterprise network 1601. The client devices may alternatively be referred to as "user devices" 1670 and 1699.

ICS 1600 replaces the voice mail server typically found in enterprise networks with at least one MCS 1610. MCS 1610 is coupled to the private communications network (e.g., PBX) of each network enterprise. While one MCS is shown in this example system 16, the enterprise network may include multiple MCSs 1610 coupled to enterprise network in an "N+1" configuration, where "N" is any number 1, 2 . . . X.

For security reasons, communication to and from the MCS is restricted in an embodiment. The MCS communicates with the IM servers, the private communications network, other MCSs and selected client devices. According to an embodiment of the invention, communications with the MCS may be restricted to network components having particular known addresses. Additionally or alternatively, communications with the MCS may require authentication by passcode or other security measures for certain kinds of access, for example, for access by the administrator. Security may also or alternatively be encrypted and/or provided by requiring a physical connection between the MCS and other component, such as in the case of a connection between an MCS and a private communications network through a direct cable connection.

The MCS via the FBUI generally provides a form to a client device from a first server (e.g., messaging server, MSERV, etc.) via a network connection. The form includes data or code that when executed by the receiving client device results in presentation of a FBUI on a display of the client device. The FBUI includes a number of buttons or icons that allow a user to select an action on an item via a second server (e.g., communication server, MCS, etc.), where the item is stored on the first and/or second servers, and the first and second servers are different servers. The FBUI of an embodiment uses a web browser embedded in the form as the means for coupling and/or communicating with a corresponding browser control of the second server. Communications between the client device and the second server thus avoid security and/or other network policy issues that would prohibit the client device from communicating with the second server via the network coupling between the client device and the first server.

As described above, the FBUI operates as a form-based messaging interface to transfer a first message (e.g., voice mail message) to a messaging server (e.g., MSERV) from a communication server (e.g., MCS) via a first coupling (e.g., IM). The messaging server generates a second message (e.g., email message) in response to a type of the first message and transfers the second message to a client device via a second coupling (e.g., LAN). The type of the first message is specified by the communication server using properties on the message that identify the message as a "Voice Mail Type" ("VMT") message. The second message is of a different type and includes data of the first message, but is not so limited. The communication server also transfers to the client device form data that corresponds to the first message. The client device uses the form data to establish a third coupling (e.g., browser link) between the client device and the communication server. The user may direct actions on the first message from the client device via the third coupling using the form data.

The ICS of an embodiment provides the FBUI 1680 to a user via his/her local client device. The FBUI is provided to the client device through the use of a FBUI Form, where the structure of the FBUI Form conforms to the message structure of the messaging server environment. For example, when the messaging server environment includes the use of Microsoft Exchange and Microsoft Outlook, the FBUI Form is generated to comply with Microsoft formats as appropriate to Exchange and Outlook Information for generation of the FBUI Form is provided to the messaging server environment by the MCS via the IM, and the code used for FBUI Form generation is hosted by the MSERV in an embodiment. The FBUI Form of an embodiment includes code that generates information of the FBUI display as well as the buttons of the display. The FBUI Form further includes an embedded browser control for use in establishing communications between the client device displaying the FBUI Form and a web server (e.g., MCS, IM, other server) for example. The embedded browser control therefore allows the host client device to couple and communicate with a server that is different from the MSERV via a communication channel that is outside the enterprise network LAN. Thus, the FBUI Form enables a communication channel between the local client device currently executing the form and a component like the MCS and/or IM in spite of network policy issues that otherwise might prohibit the client device from communicating outside the enterprise network message infrastructure.

Using the FBUI, a user can access/view and take a variety of actions on his/her voice mail messages within an email framework of the host enterprise network system. As an example, when the MCS of an embodiment receives a voice mail message it transfers the voice mail message to the MSERV, as described above. In transferring the voice mail message to the MSERV, the MCS specifies properties on the message that identify the message as a "Voice Mail Type" ("VMT") message. The message is received and stored by the MSERV as a VMT message using the same storage and retrieval structure as used with other message types like email messages.

At such time as a user wishes to access his/her messages via his/her client device, the active message browser of the client device receives the VMT message along with any other mail messages currently stored in his/her electronic mail box. The message browser corresponds to the message structure of the messaging server environment (e.g., Outlook in a Microsoft environment). Upon receipt of the message, the message browser identifies the message as a VMT message. As the code that implements the FBUI Form is stored on the MSERV, implementation of the functionality and/or features associated with the FBUI Form uses communication between the user's client device and the MSERV via the LAN. For example, the client device message browser requests the FBUI Form from the MSERV in response to identifying a message as a VMT message because this is the form that corresponds to the VMT message type. The MSERV transfers the FBUI Form to the requesting client device, and the client device message browser launches the form in response to the user selecting a VMT message for viewing.

Figure 17:
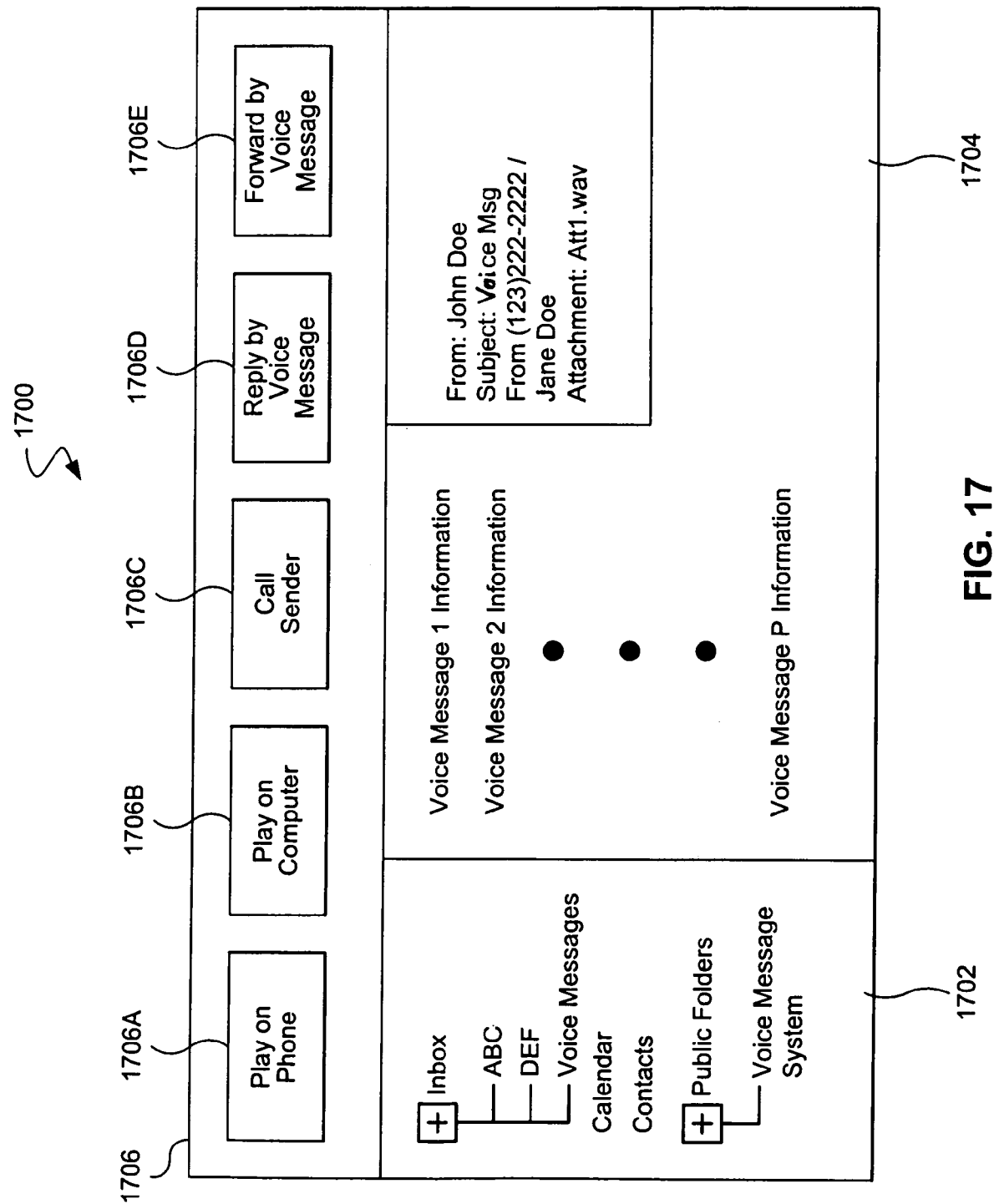
FIG. 17 is a sample FBUI as displayed on a client device, under an embodiment.

The message browser uses data or code of the FBUI Form to display the FBUI on the user's client device. FIG. 17 is a sample FBUI 1700 as displayed on a client device, under an embodiment. The FBUI 1700 includes three areas 1702-1706 that present information to a user. The areas include a folder area 1702, a contents area 1704, and a function area 1706, but are not limited to these areas as the UIs of alternative embodiments may present any number and/or type of areas. In alternative embodiments, all three areas 1702-1706 may be presented at the same time, as shown in FBUI 1700, or various subsets of the three areas may be presented at the same time in various combinations.

Folder area 1702 presents one or more folders to which the user has access via the FBUI 1700 and the client device. The "INBOX" may contain a list of voice mail messages in the same listing as other messages, including email messages. Alternatively, the Inbox may include a subfolder ("VOICE MESSAGES") which includes the voice mail messages, and selection of this folder results in the presentation of voice mail messages of the user's mail box in the contents area 1704.

The contents area 1704 generally presents the contents of the folder selected using the folder area 1702. As an example, the contents area 1704 presents information corresponding to any number of voice mail messages in the user's mail box when the INBOX or VOICE MESSAGES folder is selected. Contents area 1704 allows the user to select a particular voice mail message by placing a cursor on "VOICE MESSAGE 1 INFORMATION" for example. By (double) clicking a message in the contents area 1704 or otherwise indicating to the message browser to display a voice message, a new window (referred to as the "ICS Window") is displayed. The ICS Window now includes function are 1706.

Function area 1706 of FBUI 1700 presents one or more "voice mail action buttons" 1706A-1706E (also referred to herein as "buttons") each of which represents an action the user may select for a voice mail message. In this example, the VOICE MESSAGES folder is selected, and selection of a message in contents area 1704 allows the user to take an action on the selected message using buttons 1706A-1706E. Placing the cursor of contents area 1704 on a particular message and choosing an action on the selected message with a button 1706A-1706E therefore invokes operations on the message via components of the ICS (e.g., MCS, Cache, IM). The buttons 1706A-1706E of an embodiment include a "Play on Phone" button 1706A, a "Play on Computer" button 1706B, a "Call Sender" button 1706C, a "Reply by Voicemail" button 1706D, and a "Forward by Voicemail" button 1706E, but the embodiment is not limited to this same number of buttons or to buttons offering the same functionality.

In other embodiments, presentation of areas or information of the FBUI may vary in many ways. For example, in one embodiment, the action buttons 1706 appear after the user has selected (for example by double clicking a particular voice message from the contents area 1704. Action buttons 1706 may also appear when the user right clicks on a particular voice message in the contents area 1704.

The folder area 1702 may also include a subfolder ("VOICE MESSAGE SYSTEM") under the Public Folder. As such, the VOICE MESSAGE SYSTEM folder may not be considered an actual folder but instead a uniform resource locator ("URL") that, when selected, sends an HTTP request to a web server and launches/displays an ICS browser inside the client device message browser. The web server may, for example, be a component of the MCS and/or IM, but is not so limited. The ICS browser is an embedded or hidden browser that displays the ICS Window in the area of the client device message browser where emails would typically appear, and the voice mail messages are displayed in the ICS Window.

As an example, the ICS Window is displayed in the contents area 1704 of an embodiment. The ICS Window may be served from the IM and may contain any information related to the voice messaging system that is user specific. In one embodiment, the ICS Window will display a user login prompt where the user enters the user name and PIN code. Subsequently, the system displays the user's configuration date, such as PIN code, attendant extension, greeting type, and other applicable information.

The hidden browser enables an HTTP link and communications with the IM, for example, which then brokers communications (via HTTP) with the MCS via the MCS Web Server (FIG. 6) for example. Therefore, while typical messaging servers and LANs use security policies that restrict the use of "special" code in form data, use of the hidden browser embedded in a form structure that is native to the host system overcomes this restriction because the browser is not detected or considered as special code. Use of the hidden browser thus supports communication with the corresponding browser control in the MCS and/or the IM, thereby allowing the integration of voice mail messaging provided by the MCS with the email messaging system of the enterprise network A "voice mail message" in the ICS is generally any message created using a client device generating an audio stream. A "voice mail message" is also any VMT message, such as a message created using the "Reply by Voice Message" and "Forward by Voice Message" buttons of the FBUI. An "email" is any message created using buttons of a host mail message system that function to generate a reply message or to forward a message in response to receipt of a message, even if replying or forwarding a voice mail message. The ICS of an embodiment presents a voice mail message to a user in an email message system using the FBUI as the presentation form.

As described above, FBUI 1700 allows a user to take action on a voice mail message via buttons 1706A-1706E of FBUI 1700. Therefore, placing the cursor of contents area 1704 on a particular message and choosing an action on the selected message with a button 1706A-1706E invokes the action on the message via components of the MCS and/or the enterprise network environment.

As one example of an action on a voice mail message, and with further reference to FIG. 16, the user may select a "Play on Phone" action using button 1706A. In response the user's client device couples to a component of the ICS (e.g., IM) using the hidden browser of the FBUI. The client device receives a pop-up message from the ICS via the browser link and the ICS Window, where the pop-up message allows the user to choose or enter a telephone number to which he/she would like the selected voice mail message routed. The pop-up message also includes a "connect" button by which the user initiates routing of the selected voice mail message to the selected telephone. In response to selection of the "connect" button, the IM couples with an MCS, and the MCS causes the PBX to initiate a call to the telephone number selected by the user via the pop-up window. Upon connection of the call from the PBX to the selected telephone, the MCS pushes the contents of the voice mail message to the selected telephone.

Another example of an action on a voice mail message includes selection of a "Play on Computer" action by the user via button 1706B. In response the user's client device couples to a component of the ICS (e.g., IM) using the hidden browser of the FBUI. In response to selection of the "Play on Computer" button, the IM couples with an MCS, and the MCS pushes a form to the user's computer that resembles a typical email. The form includes an attachment that is an audio file (e.g., WAVE, MP3, other audio formats, etc.). When the user selects the attachment the client device may launch the default audio player of the client device.

Alternatively, selection of the attachment in a "Play on Computer" action may result in the browser form controlling launch of a pre-specified audio player instead of the default audio player. This is similar to the hidden browser described above with reference to presentation of the FBUI.

The user may also select a "Call Sender" action on a voice mail message using button 1706C. In response the user's client device couples to a component of the ICS (e.g., IM) using the hidden browser of the FBUI. In response to selection of the "Call Sender" button, the IM couples with an MCS, and the MCS retrieves the selected message from the Cache or the MSERV. Using the caller information from the retrieved message, the MCS causes the PBX to connect the call to the user's local telephone. Upon connection of the call from the PBX to the user's telephone, the MCS causes the PBX to initiate a call to the sender's telephone number as determined from the caller information associated with the voice message.

Additionally, the user may select a "Reply by Voice Message" action on a voice mail message using button 1706D. In response the user's client device couples to a component of the ICS (e.g., IM) using the hidden browser of the FBUI. In response to selection of the "Reply by Voice Message" button, the IM couples with an MCS, and the MCS retrieves the selected message from the Cache or the MSERV. The MCS causes a reply message to be generated corresponding to the received message, and prompts the user to record an audio message for the reply. The user records the audio for the reply via a microphone coupled to his/her client device. Alternatively, the user may record the audio for the reply via his/her local telephone. Upon completing the audio reply recording, the MCS causes the reply message to be transmitted to the designated addressees via the MSERV. A user is not required to listen to a message to invoke the "Reply by Voice Message" action.

The user may also select a "Forward by Voice Message" action on a voice mail message using button 1706E. In response the user's client device couples to a component of the ICS (e.g., IM) using the hidden browser of the FBUI. The client device receives a pop-up message from the ICS via the browser link, where the pop-up message allows the user to choose or enter a telephone number to which he/she would like the selected voice mail message routed. The pop-up message also includes a "connect" button by which the user initiates routing of the selected voice mail message to the selected telephone. In response to selection of the "connect" button, the IM couples with an MCS, and the MCS causes the PBX to initiate a call to the telephone number selected by the user via the pop-up window. Upon connection of the call from the PBX to the called telephone selected by the user, the MCS pushes the contents of the voice mail message to the called telephone and the user. During the session, and in addition to the contents of the voice mail message, the MCS may provide a verbal prompt to the user requesting information of the party to whom the message is to be forwarded, and/or a prompt to the user to record an audio message to be forwarded along with the forwarded message. A user is not required to listen to a message to invoke the "Forward by Voice Message" action.

Figure 18:
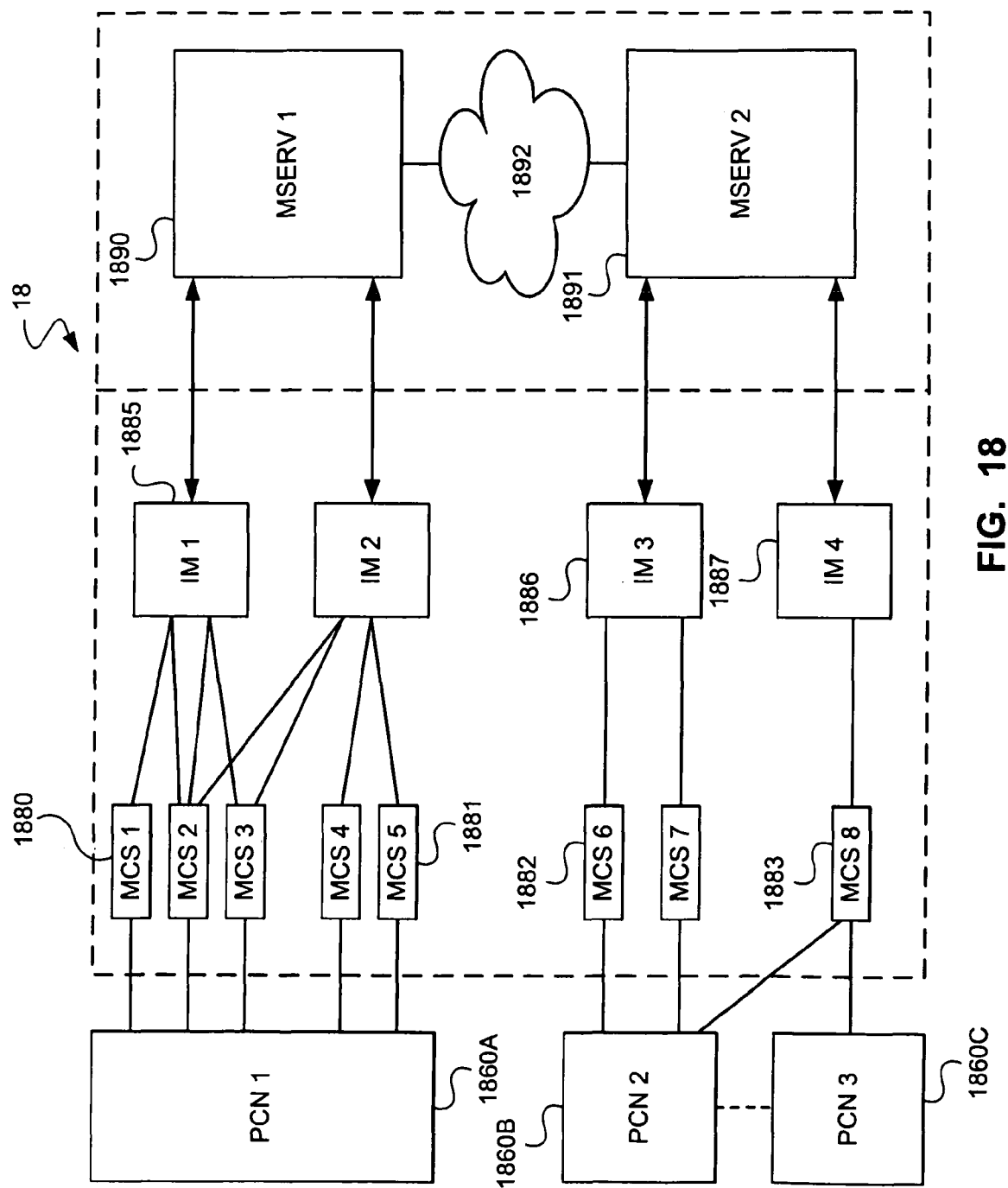
FIG. 18 is a block diagram of a system that includes multiple sites and multiple components, under an alternative embodiment.

FIG. 18 is a block diagram of a system 18 that includes multiple Sites (defined herein) and multiple components, under an alternative embodiment. System 18 includes multiple Sites, some of which may have multiple MCSs, IMs, private communication networks and MSERVs. As shown, system 18 includes MSERV 1890 and MSERV 1891 communicating via a network 1892, which may comprise any of a public network, such as a PSTN, or private communications network or other network. The MSERVs are coupled to one or more IMs. For example, as shown here, MSERV 1890 is coupled to IMs 1885 (IM1 and IM2), and MSERV 1891 is coupled to IMs 1886 (IM3 and IM4). The IMs are coupled to one or more MCSs. For example, as shown here IM1 is coupled to MCS1, MCS2, and MCS3; IM2 is coupled to MCS2, MCS3, MCS4 and MCS5; IM3 is coupled to MCS6 and MCS7; and IM 4 is coupled to MCS8. The MCSs are coupled to private communications networks. As shown here, MCS1, MCS2, MCS3, MCS4 and MCS 5 are coupled to private communications network 1 1860A; MCS6, and MCS7 are coupled to private communications network 2 1860B; and MCS8 is coupled to private communications network 2 1860B and private communications network 3 1860C.

Thus, FIG. 18 shows a system 18 that is scalable in a number of different dimensions, according to various embodiments of the invention. Two MSERVs are shown coupled by a network. This configuration allows for sharing of voicemail messages, user lists, global address lists, distribution lists and public folders between the various MSERVs that connected by a network and which may be placed at the same or different locations. Additionally, use of multiple MSERVs allows for scaling of the overall system through the increased capacity provided by the multiple MSERVs.

Multiple MCSs are shown. Increased number of MCSs can help to increase overall system capacity and/or redundancy by providing increased number of ports, storage, and processing capacity. According to an embodiment of the invention, information on the MCSs is derived from the MSERVs and automatically cached on the MCSs. This allows for easy deployment of new MCSs by which the data and configuration settings for the new MCSs are acquired from the MSERV(s) and/or caches of other MCSs. Additionally, an MCS may be coupled to more than one private communications network. In some cases an MCS may operate with multiple private communications networks simultaneously. Also, an MCS that is coupled to multiple private communications networks may continue operation with a non-failing private communications network in the event that one of the private communications networks to which the MCS is coupled fails. In one embodiment, the MCS that is coupled to multiple private communications networks operates with at least one of the private communications networks, but begins to operate with another, non-failing private communications network in the event that a private communications network to which the MCS is coupled fails.

Multiple IMs are shown in FIG. 18, which help to support the capacity of additional MCSs. The multiple IMs also may provide fail over support for each other in the event that one of the IMs fails.

In FIG. 18, the equipment and users associated with a particular private communications network referred to as members of a "Site." Accordingly, a user may have a Site identification. The Site identification may be used to filter user information associated with a particular Site from the a broader set of user information stored on the MSERV servicing multiple Sites. Additionally, Sites may be combined into auto attendant groups. The auto attendant groups are Sites that share a common dial plan. For example, members of an auto attendant group may able to place calls using extension numbers instead of full numbers.

According to an embodiment of the invention, various subsets of users may be defined from among the users in an MSERV or set of networked MSERVs. Such subsets of users may be defined by a Site identification. In this way, various subsets of users may be associated with different respective private communications networks, such that the users' access to respective Sites within a network of MSERVs depends on the users' membership in the various defined subsets of users. For example, members of a subgroup of users associated with a particular Site may be able to use functions such as message waiting indication and control of messaging actions at their associated Site but not at other Sites.

As described herein, the ICS includes: a network that includes a database storing a groupware application and a directory service, wherein the directory service stores user information for use in providing messaging of a first type among client devices coupled to the network; a messaging communication server (MCS) that couples to the network and to at least one communication network, wherein the MCS provides messaging of a second type among client devices coupled to the network; and an interface module that couples the MCS to the network, the interface module pushing user information from the database to the MCS, wherein the MCS uses the pushed user information to provide the second type of messaging, wherein the MCS and the interface module provide integration of the messaging of the second type into the network.

In an embodiment, the ICS further comprises a cache that couples to the MCS, the cache holding the user information pushed by the interface module.

The interface module may detect changes to the user information and incrementally pushes the changes to the MCS.

In an embodiment, the MCS includes at least one voice application and various application programming interfaces ("APIs"); and messaging of the second type includes voice messaging, and wherein the cache further couples to a state machine framework, wherein communications among the at least one voice application, the cache, groupware application and a directory service take place via the state machine framework and the various APIs as appropriate to a state of the groupware application.

The state of the groupware application includes an online state in which the groupware application communicates with the MCS, and an offline state in which the groupware application does not communicate with the MCS.

In an embodiment, the voice applications include a voice mail messaging application, and wherein the user information includes user information particular to the voice messaging application.

An embodiment of the ICS includes an integrated messaging system, comprising: an enterprise network that includes a database storing a groupware application and a directory service, wherein the directory service stores user information for use in providing messaging of a first type among client devices coupled to the enterprise network; at least one messaging communication server (MCS) that couples to the enterprise network and to at least one communication network, wherein the MCS provides messaging of a second type among client devices coupled to the enterprise network; an interface module ("IM") that couples the MCS to the enterprise network, the interface module pushing user information from the database to the MCS, wherein the MCS uses the pushed user information to provide the second type of messaging; and at least one cache that couples to the MCS, wherein the cache holds the user information pushed by the interface module.

The second type of messaging may include voice mail messaging, and the MCS may further comprise voice applications, including a voice mail application, wherein the MCS stores voice mail-specific information in the user information in the directory service via the IM.

In an embodiment, the at least one cache includes a local cache that is local to a certain MCS, and a distributed cache that is communicatively coupled among multiple MCSs, wherein the user information pushed by the IM includes: a global address list ("GAL") that includes information pertaining to all members of the enterprise; public folders that include information of the enterprise that is shared with all users, including shared contact information and shared calendar information; personal contacts folders that include corresponding contact information for each member of the enterprise; and a user list that includes information of users of the integrated messaging system.

The GAL, public folders, and user list may each be pushed periodically.

The personal folders may be pushed on demand, including when a user logs into the MCS.

The personal folders may be pushed incrementally, including upon detecting an update of information in a personal folder.

The user list may be pushed incrementally, including upon detecting an update of information in the user list.

Updated information in the personal folders may be pushed incrementally upon detecting an update of information in a personal folder.

The personal folders include a user contacts folder, and wherein the contacts folder is pushed incrementally, including pushing the contacts folder to the MCS upon a user initially logging into the MCS, wherein the contacts folder is pushed with a timestamp, wherein the timestamp is applied prior to accessing the contacts folder for pushing.

Pushing the contacts folder incrementally includes receiving the contacts folder and a timestamp subsequent to the user logging into the MCS, including receiving detected updates to the contacts folder.

Pushing the contacts folder incrementally further comprises: the MCS receiving the requested contacts folder, timestamp and a total number of contacts listed in the contacts folder; comparing the received total number of contacts with a cached total number of contacts corresponding to a previous version of the contacts folder; and if there is a difference between the two totals, requesting the contacts folder to be pushed by the IM to the MCS.

An embodiment of the ICS as described herein further comprises a method for integrated messaging, comprising: interfacing with a network using an interface module ("IM"), the network including a database storing a groupware application and a directory service, wherein the directory service stores user information for use in messaging of a first type among client devices coupled to the network; pushing the user information with the IM from the database to a messaging communication server (MCS), wherein the MCS couples to at least one communication network and to the network; caching the pushed user information; and providing messaging of a second type among the client devices, wherein the MCS uses the pushed user information to provide the messaging of a second type.

The messaging of the second type may include voice mail messaging, and the MCS may include voice applications. The method may further include detecting changes to the user information using the IM, and pushing the detected changes to the MCS.

The voice applications may perform functions including: maintaining shared address lists that all voice mail users can view and edit; scheduling meetings that include people and conference rooms by viewing associated free or busy schedules sending a new voice mail; forwarding a received voice mail; exchanging voice mails and corresponding information with the groupware applications; and granting people other than a voice mail user access to user voice mailboxes on behalf of the user.

In an embodiment, the cache includes a local cache that is local to a certain MCS, and a distributed cache that is communicatively coupled among multiple MCSs.

The user information pushed by the IM includes: a global address list ("GAL") that includes information pertaining to all members of the enterprise; public folders that include information of the enterprise that is shared with all users, including shared contact information and shared calendar information; and personal contacts folders that include corresponding contact information for each member of the enterprise.

The GAL and the public folders may be each pushed periodically.

The personal folders may be pushed on demand, including when a user logs into the MCS.

The personal folders are pushed incrementally, including upon detecting an update of information in a personal folder.

Updated information in the personal folders may be pushed incrementally upon detecting an update of information in a personal folder.

The personal folders include a user contacts folder, and the contacts folder is pushed incrementally, including pushing the contacts folder to the MCS upon a user initially logging into the MCS, wherein the contacts folder is pushed with a timestamp, wherein the timestamp is applied prior to accessing the contacts folder for pushing.

Pushing the contacts folder incrementally includes receiving the contacts folder and a timestamp subsequent to the user logging into the MCS, including receiving detected updates to the contacts folder.

Pushing the contacts folder incrementally further comprises: the MCS receiving the requested contacts folder, timestamp and a total number of contacts listed in the contacts folder; comparing the received total number of contacts with a cached total number of contacts corresponding to a previous version of the contacts folder; and if there is a difference between the two totals, requesting the contacts folder to be pushed by the IM to the MCS.

The components of the ICS described above include any collection of computing components and devices operating together. The components of the ICS can also be components or subsystems within a larger computer system or network. The ICS components can also be coupled among any number of components (not shown), for example other buses, controllers, memory devices, and data input/output (I/O) devices, in any number of combinations. Further, components of the ICS can be distributed among any number/combination of other processor-based components.

Aspects of the ICS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the ICS include: microcontrollers with memory (such as electronically erasable programmable read only memory (EEPROM)), embedded microprocessors, firmware, software, etc. Furthermore, aspects of the ICS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the ICS may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the ICS is not intended to be exhaustive or to limit the ICS to the precise form disclosed. While specific embodiments of, and examples for, the ICS are described herein for illustrative purposes, various equivalent modifications are possible within the scope of the ICS, as those skilled in the relevant art will recognize. The teachings of the ICS provided herein can be applied to other processing systems and methods, not only for the systems and methods described above.

The elements and acts of the various embodiments described above can be combined to provide further embodiments. These and other changes can be made to the ICS in light of the above detailed description.

In general, in the following claims, the terms used should not be construed to limit the ICS to the specific embodiments disclosed in the specification and the claims, but should be construed to include all processing systems that operate under the claims. Accordingly, the ICS is not limited by the disclosure, but instead the scope of the ICS is to be determined entirely by the claims.

While certain aspects of the ICS are presented below in certain claim forms, the inventors contemplate the various aspects of the ICS in any number of claim forms. For example, while only one aspect of the ICS is recited as embodied in machine-readable medium, other aspects may likewise be embodied in machine-readable medium. Accordingly, the inventors reserve the right to add additional claims after filing the application to pursue such additional claim forms for other aspects of the ICS.

What is claimed is:

1. A system comprising:
   a packet-based data network;
   a database software executing on a server coupled to the packet-based data network and adapted for storing directory information concerning users of a first text-based messaging system;
   a messaging communication server (MCS) coupled to the packet-based data network and to at least one communication network and adapted for providing a second streaming-media-based messaging system; and
   an interface software executing on the server coupled to the packet-based data network and adapted to transmit directory information pertaining to users of the first messaging system to the MCS from the database software;
   wherein the MCS uses the transmitted user information to provide the second type of messaging, wherein the messaging of the second type includes voice mail messaging, and wherein the MCS comprises voice applications, wherein the voice applications perform functions including one or more of:
      maintaining shared address lists that all voice mail users can view and edit;
      scheduling meetings that include people and conference rooms by viewing associated free or busy schedules; and
      granting people other than a voice mail user access to user voice mailboxes on behalf of the user.

2. The system of claim 1, further comprising a cache for storing the user information, wherein the MCS obtains the user information from the cache.

3. The system of claim 2, wherein the cache includes:
   a local cache that is local to the MCS; and
   a distributed cache that is communicatively coupled among multiple MCSs.

4. The system of claim 1, wherein the user information comprises one or more of:
   a global address list (GAL) that includes information pertaining to all members of the enterprise;
   public folders that include information of the enterprise that is shared with all users, including shared contact information and shared calendar information;
   personal contacts folders that include corresponding contact-information for each member of the enterprise; and
   a user list that includes information of users of the integrated messaging.

5. The system of claim 4, wherein the GAL and the public folders are each pushed periodically to the MCS.

6. The system of claim 4, wherein the personal folders are pushed to the MCS on demand, including when a user logs into the MCS.

7. The system of claim 4, wherein the personal folders are pushed incrementally to the MCS, including upon detecting an update of information in a personal folder.

8. The system of claim 4, wherein updated information in the personal folders is pushed incrementally to the MCS upon detecting an update of information in a personal folder.

9. The system of claim 4, wherein the personal folders include a user contacts folder, and wherein the contacts folder is pushed incrementally to the MCS, including pushing the contacts folder to the MCS upon a user initially logging into the MCS, wherein the contacts folder is pushed with a timestamp.

10. The system of claim 9, wherein the timestamp is applied prior to accessing the contacts folder for pushing.

11. The system of claim 9, wherein pushing the contacts folder incrementally includes receiving the contacts folder and a timestamp subsequent to the user logging into the MCS, including receiving detected updates to the contacts folder.

12. The system of claim 11, wherein the MCS is adapted to receive the requested contacts folder, timestamp and a total number of contacts listed in the contacts folder, compare the received total number of contacts with a cached total number of contacts corresponding to a previous version of the contacts folder, and if there is a difference between the two totals, request the contacts folder to be pushed by the IM to the MCS.

13. A method for integrated messaging, comprising:
   receiving, at an integrated communication system, data streams from networks of different types;
   generating, by the integrated communication system, a first message;
   transferring, by the integrated communication system, the first message to a messaging server;
   detecting, by the messaging server, a type of first message using information obtained from the first message;
   generating, by the messaging server, a second message that is of a different type from that of the first message and includes information of the first message;
   transferring, by the messaging server, the second message to a client device;
   wherein the first message corresponds to a voice mail message, wherein the second message corresponds to a text-based message, and wherein a user of the client device is capable of directing actions on the first message via the coupling between the client device and the communication server using form data;
   determining, by the client device, a type of the second message;
   requesting, by the client device of the messaging server, form data that corresponds to the second message; and transferring, from the messaging server to the client device, the requested form data, wherein the form data is used by the client device to view contents of the second message and wherein the form data is also used to establish communications with a communication server of the integrated communication system via a coupling, wherein the communication protocol used via the coupling between the client device and the communication server is different than the communication protocol used to transmit the second message.

* * * * *